(12) United States Patent
Matsumoto et al.

(10) Patent No.: US 8,385,371 B2
(45) Date of Patent: Feb. 26, 2013

(54) FRAME SYNCHRONIZER, FRAME SYNCHRONIZATION METHOD AND DEMODULATOR

(75) Inventors: Hideyuki Matsumoto, Tokyo (JP); Tetsuhiro Futami, Kanagawa (JP); Atsushi Makita, Tokyo (JP); Takashi Yokokawa, Kanagawa (JP); Doan Tien Dung, Kanagawa (JP); Yuichi Mizutani, Tokyo (JP)

(73) Assignee: Sony Corporation, Tokyo (JP)

( * ) Notice: Subject to any disclaimer, the term of this patent is extended or adjusted under 35 U.S.C. 154(b) by 618 days.

(21) Appl. No.: 12/597,527

(22) PCT Filed: Apr. 25, 2008

(86) PCT No.: PCT/JP2008/058012
§ 371 (c)(1),
(2), (4) Date: Oct. 26, 2009

(87) PCT Pub. No.: WO2008/136375
PCT Pub. Date: Nov. 13, 2008

(65) Prior Publication Data
US 2010/0135335 A1 Jun. 3, 2010

(30) Foreign Application Priority Data
Apr. 27, 2007 (JP) ................. P2007-119094

(51) Int. Cl.
*H04J 3/06* (2006.01)
(52) U.S. Cl. ......... 370/503; 370/470; 375/359; 375/362
(58) Field of Classification Search .......... 370/203–210, 370/350, 470–474, 503, 342; 375/260, 329, 375/322, 295, 348, 359, 362; 455/40, 456.1
See application file for complete search history.

(56) References Cited

U.S. PATENT DOCUMENTS

| 7,940,866 B2 * | 5/2011 | Yuan et al. | 375/343 |
| 7,978,732 B2 * | 7/2011 | Kim et al. | 370/470 |

(Continued)

FOREIGN PATENT DOCUMENTS

| CA | 2 470 546 | 6/2004 |
| CA | 2 470 782 | 6/2004 |

(Continued)

OTHER PUBLICATIONS

"Digital Video Broadcasting (DVB) User Guidelines for the second generation system for Broadcasting, Interactive Services, News Gathering and other broadband satellite applications (DVB-S2);ETSI TR 102 376" ETSI Standards, LIS, Sophia Antipolis Cedex, France, vol. BC, No. V1.1.1, Feb. 1, 2005, XP014027139 ISSN: 0000-0001.

(Continued)

*Primary Examiner* — Michael Thier
*Assistant Examiner* — Vincelas Louis
(74) *Attorney, Agent, or Firm* — Frommer Lawrence & Haug LLP; William S. Frommer; Paul A. Levy

(57) ABSTRACT

A frame synchronizer, frame synchronization method and demodulator which can more positively establish frame synchronization of an input signal which is likely to have a plurality of frame lengths. A differential correlation detector calculates a differential correlation value with no pilot which is associated with the absence of a pilot signal inserted in the input signal and a differential correlation value with a pilot which is associated with the presence of a pilot signal inserted in the input signal. Frame period confirmation counters perform, based on the differential correlation values with no pilot, frame synchronization control appropriate to the input signals whose frame lengths are 21690 and 32490 symbols, respectively. The frame period confirmation counters 1 perform, based on the differential correlation values with a pilot, frame synchronization control appropriate to the input signals whose frame lengths are 22194 and 33282 symbols, respectively.

9 Claims, 16 Drawing Sheets

U.S. PATENT DOCUMENTS

| | | | |
|---|---|---|---|
| 2002/0071477 A1 | 6/2002 | Orava | |
| 2004/0252229 A1 | 12/2004 | Jiang et al. | |
| 2004/0252725 A1 | 12/2004 | Sun et al. | |
| 2005/0063297 A1* | 3/2005 | Sakata et al. | 370/208 |
| 2005/0089068 A1* | 4/2005 | Sun et al. | 370/509 |
| 2006/0176984 A1* | 8/2006 | Lee et al. | 375/343 |
| 2007/0002975 A1* | 1/2007 | Meyer | 375/329 |
| 2007/0086550 A1* | 4/2007 | Kaise | 375/348 |
| 2007/0206638 A1 | 9/2007 | Santoru et al. | |
| 2008/0018802 A1* | 1/2008 | Yu | 348/728 |

FOREIGN PATENT DOCUMENTS

| | | | |
|---|---|---|---|
| CA | 2 577 539 | 8/2007 | |
| CN | 1630280 | 6/2005 | |
| CN | 1630281 | 6/2005 | |
| EP | 0 915 588 | 5/1999 | |
| EP | 1 267 536 | 12/2002 | |
| EP | 1 487 146 | 12/2004 | |
| EP | 1 487 166 | 12/2004 | |
| EP | 1 835 676 | 9/2007 | |
| JP | 2005 6338 | 1/2005 | |
| JP | 2005 12794 | 1/2005 | |
| JP | 2007 259422 | 10/2007 | |
| KR | 10-2004-0107436 | 12/2004 | |
| KR | 10-2004-0107437 | 12/2004 | |
| KR | 10-2007-0080845 | 8/2007 | |
| WO | WO 2007/067021 | * 6/2007 | 5/44 |
| WO | WO 2008 069448 | 6/2008 | |

OTHER PUBLICATIONS

Sun F-W et al: "Frame Synchronization and Pilot Structure for Second Generation DVB Via Satellites" International Journal of Satellite Communications, John Wiley and Sons, US Linkd—DOI:10.1002/SAT.793, vol. 22, No. 3, Jan. 1, 2004, pp. 319-339, XP008036682 ISSN: 0737-2884.

* cited by examiner

ODD-NUMBERED SYMBOL          EVEN-NUMBERED SYMBOL

| MODULATION SCHEME | PILOT SIGNAL | FRAME LENGTH L [SYMBOL] |
|---|---|---:|
| QPSK | YES | 33282 |
|  | NO | 32490 |
| 8PSK | YES | 22194 |
|  | NO | 21690 |

FIG.14

| MODULATION SCHEME | PILOT SIGNAL | NUMBER OF KNOWN SYMBOLS PER FRAME | | | |
|---|---|---|---|---|---|
| | | SOF | PLSC | PILOT SIGNAL | TOTAL |
| QPSK | YES | 26 | 64 | 1980 | 2070 |
| | NO | | | 0 | 90 |
| 8PSK | YES | | | 1260 | 1350 |
| | NO | | | 0 | 90 |

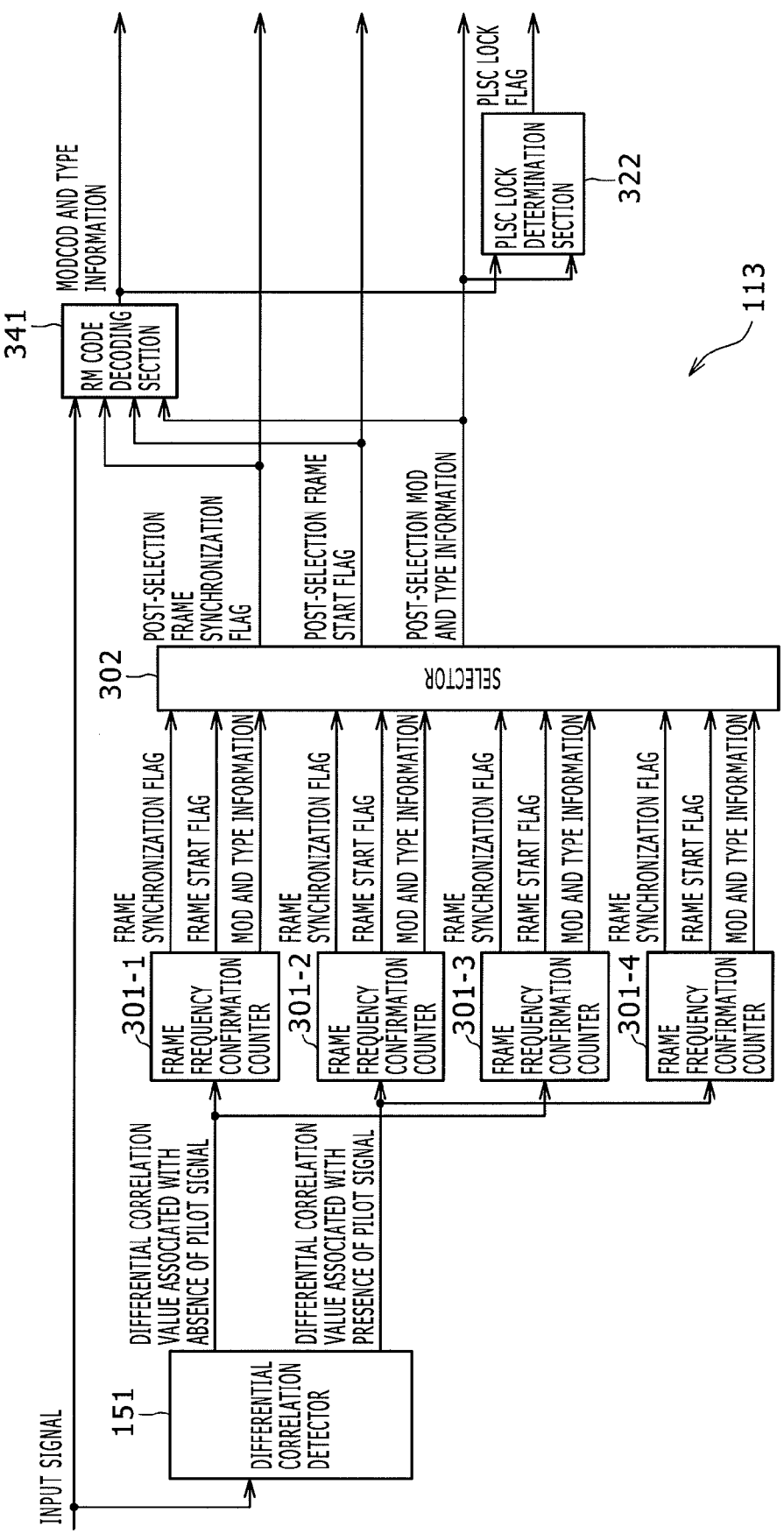

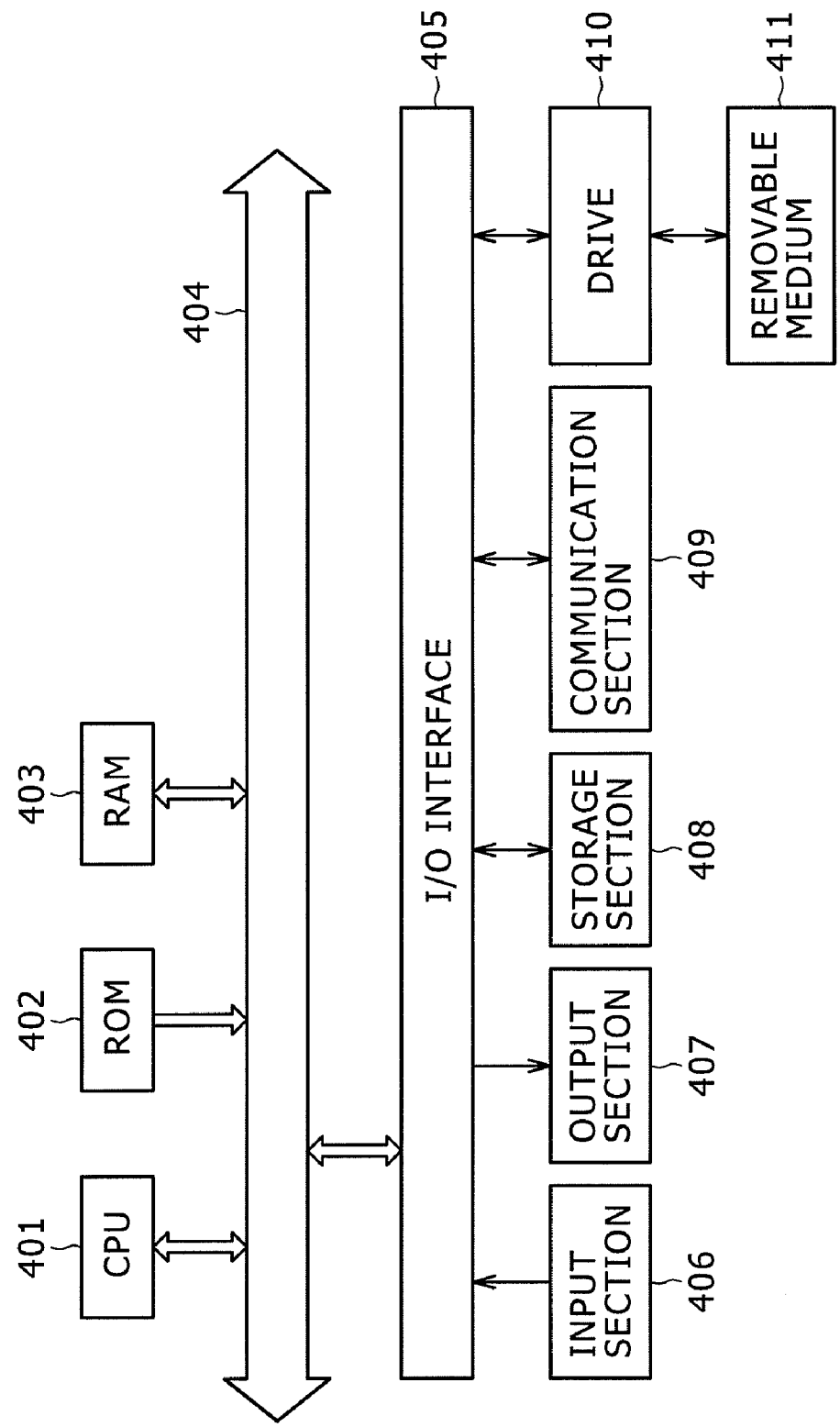

FRAME SYNCHRONIZER, FRAME SYNCHRONIZATION METHOD AND DEMODULATOR

TECHNICAL FIELD

The present invention relates to a frame synchronizer, frame synchronization method and demodulator, and more particularly to a frame synchronizer, frame synchronization method and demodulator for processing a signal likely to have a plurality of types of frame lengths.

BACKGROUND ART

The DVB-S.2 standard, one of the digital satellite broadcasting standards, is among the transmission schemes in which the transmission signal is likely to have a plurality of types of frame lengths. FIG. 1 illustrates the configuration of a transmission signal frame in the DVB-S.2 standard.

A 90-symbol header is placed at the beginning of each frame, followed by a main signal which includes a plurality of slots. Each slot is 90 symbols long. Further, a synchronizing pilot signal may be inserted in the main signal every 16 slots according to the setting.

FIG. 2 illustrates the configuration of a transmission signal header in the DVB-S.2 standard. A header includes a 26-symbol SOF (Start Of Frame) and 64-symbol PLSC (Physical Layer Signaling Code).

The SOF includes a 26-bit fixed value (hereinafter also referred to as the fixed sequence) indicating the beginning of the frame.

The PLSC includes a 64-bit code word obtained by coding 7-bit information indicating a transmission parameter relating to signal transmission into (64,7) Reed-Muller code (RM code). The 7-bit transmission parameter includes 5-bit MODCOD information and 2-bit TYPE information.

The MODCOD information indicates the frame modulation scheme and error correction code coding rate.

The MSB (Most Significant Bit) (hereinafter also referred to as the frame length parameter) of the TYPE information indicates the frame length (in bits). The value "0" (normal) or "1" (short) is set. It should be noted that, in order to facilitate the description, a description will be given below assuming that the frame length parameter does not take on any value other than "0." Further, the LSB (Least Significant Bit) (hereinafter also referred to as the pilot signal parameter) of the TYPE information indicates the presence or absence of an inserted pilot signal. The value "0" (a pilot signal inserted) or "1" (no pilot signal inserted) is set.

$\pi/2$ shift BPSK (Binary Phase Shift Keying) is used as the header modulation scheme. FIG. 3 illustrates a mapping pattern of each symbol of the header in the complex plane. A mapping pattern of an odd-numbered symbol of the header is shown on the left in FIG. 3. A mapping pattern of an even-numbered symbol of the header is shown on the right in FIG. 3. That is, when the value of an odd-numbered symbol is "0," the symbol is mapped to the point in the complex plane where the argument is $\pi/4$. When the value of an odd-numbered symbol is "1," the symbol is mapped to the point where the argument is $5\pi/4$. When the value of an even-numbered symbol is "0," the symbol is mapped to the point where the argument is $3\pi/4$. When the value of an even-numbered symbol is "1," the symbol is mapped to the point where the argument is $7\pi/4$. Therefore, the phase difference between the adjacent symbols is restricted to within the range of $\pm\pi/2$.

On the other hand, QPSK (Quaternary Phase Shift Keying) or 8PSK (8-ary Phase Shift Keying) is used as the main signal modulation scheme.

Further, the pilot signal contains QPSK unmodulated symbols. That is, each of the symbols of the pilot signal is mapped to the point $(1/\sqrt{2}, 1/\sqrt{2})$ in the complex plane where the argument is $\pi/4$.

FIG. 4 illustrates the types of transmission signal frame lengths in the DVB-S.2 standard. As described above, if the frame length parameter of the TYPE information is fixed to the value "0," the frame length takes on four types of values depending on the main signal modulation scheme (MOD) and presence or absence of an inserted pilot signal. That is, a frame length L is 33282 symbols when the main signal is modulated by QPSK with an inserted pilot signal. The frame length L is 32490 symbols when the main signal is modulated by QPSK with no inserted pilot signal. The frame length L is 22194 symbols when the main signal is modulated by 8PSK with an inserted pilot signal. The frame length L is 21690 symbols when the main signal is modulated by 8PSK with no inserted pilot signal.

A description will be given here of the frame synchronization in a demodulation circuit adapted to demodulate a signal compliant with the conventional DVB-S.2 standard. It should be noted that the term "frame synchronization" here refers to a sequence of processes adapted to receive a signal containing complex symbol strings (hereinafter also referred to as the input signal), detect the beginning of each frame and output synchronizing signals synchronous with the frames under the effect of interference such as noise or carrier frequency offset. It should be noted that a process may be included in the frame synchronization which is adapted to decode the RM code of the PLSC in the header to obtain MODCOD and TYPE information.

FIG. 5 illustrates a configuration example of a frame synchronization circuit in a demodulation circuit adapted to demodulate a signal compliant with the conventional DVB-S.2 standard described in Patent Document 1. A frame synchronization circuit 11 shown in FIG. 5 includes a differential correlation detector 21 and peak search detector 22.

The differential correlation detector 21 includes a differential calculation section 31, PLSC correlation calculation section 32, SOF correlation calculation section 33, adders 34-1 and 34-2, absolute value calculators 35-1 and 35-2, and selector 36.

The differential calculation section 31 includes a complex conjugate calculator 41, delayer 42, and multiplier 43. The differential calculation section 31 performs differential detection of the input signal and supplies the differential value obtained from the differential detection to the PLSC correlation calculation section 32.

The PLSC correlation calculation section 32 includes delayers 51-1 to 51-64, multipliers 52-1 to 52-32, and an adder 53. The same section 32 calculates, every other symbol, a correlation value indicating the symbol-to-symbol correlation between the symbol string having a differential value of the input signal (hereinafter also referred to as the reception differential sequence) and the symbol string having a correct PLSC differential value (hereinafter also referred to as the PLSC differential sequence), adds up the calculated correlation values and supplies the sum of the correlation values (hereinafter referred to as the PLSC correlation value) to the adders 34-1 and 34-2.

Incidentally, PLSC contains information coded into (64,7) Reed-Muller code (RM code) as described above. The code word of the RM code has the property that if the word is separated from the beginning into 2-bit pairs, the values of the elements of all pairs are either the same or bit-inverted.

Further, whether the values of the elements of all pairs are the same or bit-inverted depends upon the value of a specific bit in the pre-coding data.

In the case of PLSC, if the parameter value of the pilot signal, which is the LSB of the TYPE information in the coded 7-bit transmission parameter of the PLSC, is "0," the values of the elements of all pairs are the same. The values of all the pairs are either "00" or "11." If the parameter value of the pilot signal is "1," the values of the elements of all pairs are bit-inverted. The values of all the pairs are either "01" or "10." Therefore, the differential values for every other symbol from the beginning of the PLSC differential sequence are all $-j$ ($=e^{-j\pi/2}$) if the parameter value of the pilot signal is "0," and are all $j$ ($=e^{j\pi/2}$) if the parameter value of the pilot signal is "1." Thus, the differential values are inverted from each other.

The PLSC correlation calculation section 32 calculates the PLSC correlation value indicating the correlation between the PLSC and reception differential sequences if the parameter value of the pilot signal is "1," that is, if a pilot signal is inserted in the input signal. Therefore, when the header part of the input signal is fed to the differential correlation detector 21, and the reception differential sequence for the PLSC part of the input signal is fed to the PLSC correlation calculation section 32, the PLSC correlation value is ideally the positive maximum value and negative minimum value, respectively, if the parameter value of the pilot signal is "1" and "0."

The SOF correlation calculation section 33 includes delayers 61-1 to 61-25, multipliers 62-1 to 62-25, and an adder 63. The SOF correlation calculation section 33 calculates a correlation value indicating the symbol-to-symbol correlation between the reception differential sequence and the symbol string having a correct SOF differential value (hereinafter also referred to as the SOF differential sequence), adds up the calculated correlation values and supplies the sum of the correlation values (hereinafter referred to as the SOF correlation value) to the adders 34-1 and 34-2.

Therefore, the SOF correlation value is ideally the positive maximum value when the header part of the input signal is fed to the differential correlation detector 21, and the reception differential sequence for the SOF part of the input signal is fed to the SOF correlation calculation section 33.

The adder 34-1 adds the PLSC and SOF correlation values together and supplies the sum to the absolute value calculator 35-1.

The adder 34-2 adds together the values inverted in sign from the PLSC and SOF correlation values and supplies the sum to the absolute value calculator 35-2.

The absolute value calculator 35-1 calculates the absolute value of the added value from the adder 34-1 and supplies the absolute value to the selector 36.

The absolute value calculator 35-2 calculates the absolute value of the added value from the adder 34-2 and supplies the absolute value to the selector 36.

The selector 36 selects the greater of the absolute values from the absolute value calculators 35-1 and 35-2 and supplies the value to the peak search detector 22.

Ideally, therefore, if the parameter value of the pilot signal inserted in the input signal is "1," the absolute value calculated by the absolute value calculator 35-1 and the value output from the selector 36 are maximum when the header part of the input signal is fed to the differential correlation detector 21. If the parameter value of the pilot signal inserted in the input signal is "0," the absolute value calculated by the absolute value calculator 35-2 and the value output from the selector 36 are maximum when the header part of the input signal is fed to the differential correlation detector 21.

Here, a description will be given of the peak search process performed by the peak search detector 22 with reference to the flowchart shown in FIG. 6.

In step S1, the peak search detector 22 determines whether the modulation scheme is known.

If it is determined that the modulation scheme is known, the process proceeds to step S2.

In step S2, the peak search detector 22 sets a size L of the search window to the frame length appropriate to the known modulation scheme. Then, the process proceeds to step S4.

On the other hand, if it is determined in step S1 that the modulation scheme is not known, the process proceeds to step S3.

In step S3, the peak search detector 22 sets the size L of the search window to the maximum size.

In step S4, the peak search detector 22 finds a position in the search window where the correlation value output from the selector 36 peaks.

In step S5, the peak search detector 22 specifies the found peak position as a candidate.

In step S6, the peak search detector 22 decodes the MODCODE information (MODCOD and TYPE information).

In step S7, the peak search detector 22 derives the position of a next unique word based on the modulation and encoding schemes.

In step S8, the peak search detector 22 verifies whether the position derived in step S7 is actually that of the unique word and MODCODE information.

In step S9, if it is verified successively a predetermined number of times that the derived unique word position is that of the unique word and MODCODE information, the peak search detector 22 declares that frame synchronization has been achieved.

Patent Document 1: Japanese Patent Laid-Open No. 2005-6338

DISCLOSURE OF INVENTION

Technical Problem

In the invention described in Patent Document 1, however, if the MODCODE and TYPE information cannot be decoded by decoding the RM code in step S6, the subsequent process steps cannot be performed, making it difficult to establish frame synchronization. For example, in the presence of a frequency offset causing a phase rotation of $\pi/2$ or more during a PLSC 64-symbol interval, and more specifically in the presence of an approximately 117 kMHz frequency offset at a symbol rate of 30 Mbps, RM decoding fails, making it difficult to establish frame synchronization.

The present invention has been devised in light of the foregoing, and it is an object of the present invention to more positively establish frame synchronization of an input signal which is likely to have a plurality of frame lengths.

Technical Solution

A frame synchronizer of a first aspect of the present invention is a frame synchronizer for achieving frame synchronization of an input signal transmitted with any one of a plurality of predetermined types of frame lengths. The frame synchronizer includes correlation detection means and frame synchronization means. The correlation detection means calculate a correlation value indicating the correlation between a known sequence, which is a symbol string having a known value inserted in the input signal, and a reception sequence which is a symbol string obtained by detecting the input signal. The frame synchronization means, provided in a number equal to the number of types of the frame lengths in a one-to-one correspondence fashion, compare an associated frame length and a peak-to-peak spacing of the correlation value and output a synchronizing signal synchronous with the frame having the associated frame length if the associated frame length matches the peak-to-peak spacing of the correlation value.

The frame synchronization means can further output, together with the synchronizing signal, a transmission parameter adapted to determine the frame length of the input signal and appropriate to the associated frame length.

The frame synchronizer can further include extraction means and determination means. The extraction means extract the transmission parameter inserted in the input signal based on the synchronizing signal. The determination means determine the degree of reliability of the extracted transmission parameter by comparing the values of the transmission parameters output from the frame synchronization means and extracted by the extraction means.

The frame synchronizer can still further include decoding means adapted to decode the coded transmission parameter inserted in the input signal in a simplified manner using part of the transmission parameter output from the frame synchronization means.

If the known sequence takes on a plurality of values due to the value of the transmission parameter adapted to determine the frame length of the input signal, the correlation detection means can calculate correlation values associated with the known sequence with the plurality of values. The frame synchronization means can compare the peak-to-peak spacing of the correlation value associated with the value of the known sequence appropriate to the associated frame length with the associated frame length.

The frame synchronizer can still further include selection means adapted to select and output the synchronizing signal output from the frame synchronization means associated with the shortest frame length if the synchronizing signals are output from the plurality of frame synchronization means.

A frame synchronization method of a first aspect of the present invention is a frame synchronization method of a frame synchronizer for achieving frame synchronization of an input signal transmitted with any one of a plurality of predetermined types of frame lengths. The frame synchronization method includes a step of calculating a correlation value indicating the correlation between a known sequence which is a symbol string having a known value inserted in the input signal, and a reception sequence which is a symbol string obtained by detecting the input signal. The frame synchronization method includes another step of comparing an associated frame length and a peak-to-peak spacing of the correlation value by using frame synchronization means which are provided in a number equal to the number of types of the frame lengths in a one-to-one correspondence fashion. The frame synchronization method includes another step of outputting a synchronizing signal synchronous with the frame having the associated frame length if the associated frame length matches the peak-to-peak spacing of the correlation value.

A demodulator of a second aspect of the present invention is a demodulator for demodulating an input signal transmitted with any one of a plurality of predetermined types of frame lengths. The demodulator includes correlation detection means and frame synchronization means. The correlation detection means calculate a correlation value indicating the correlation between a known sequence which is a symbol string having a known value inserted in the input signal and a reception sequence which is a symbol string obtained by detecting the input signal. The frame synchronization means, provided in a number equal to the number of types of the frame lengths in a one-to-one correspondence fashion, compare an associated frame length and a peak-to-peak spacing of the correlation value and output a synchronizing signal synchronous with the frame having the associated frame length if the associated frame length matches the peak-to-peak spacing of the correlation value.

The frame synchronization means can further output, together with the synchronizing signal, a transmission parameter adapted to determine the frame length of the input signal and appropriate to the associated frame length. The demodulator can further include signal processing means adapted to adaptively change processes to be performed on the input signal depending on the quantity of the known sequence found from the transmission parameter output from the frame synchronization means if the transmission parameter contains a parameter adapted to define the quantity of the known sequence inserted in the frame.

In the first aspect of the present invention, a correlation value is calculated which indicates the correlation between a known sequence which is a symbol string having a known value inserted in the input signal and a reception sequence which is a symbol string obtained by detecting the input signal. An associated frame length and a peak-to-peak spacing of the correlation value are compared using frame synchronization means provided in a number equal to the number of types of the frame lengths in a one-to-one correspondence fashion. A synchronizing signal is output which is synchronous with the frame having the associated frame length if the associated frame length matches the peak-to-peak spacing of the correlation value.

In the second aspect of the present invention, a correlation value is calculated which indicates the correlation between a known sequence which is a symbol string with a known value inserted in the input signal and a reception sequence which is a symbol string obtained by detecting the input signal. An associated frame length and a peak-to-peak spacing of the correlation value are compared using frame synchronization means provided in a number equal to the number of types of the frame lengths in a one-to-one correspondence fashion. A synchronizing signal is output which is synchronous with the frame having the associated frame length if the associated frame length matches the peak-to-peak spacing of the correlation value.

Advantageous Effects

According to the first or second aspect of the present invention, it is possible to establish synchronization of an input signal having a plurality of frame lengths. According to the first or second aspect of the present invention in particular, it is possible to establish synchronization in a more positive manner of an input signal likely to have a plurality of frame lengths.

BRIEF DESCRIPTION OF DRAWINGS

FIG. 14 is a diagram illustrating the number of known symbols per frame in the DVB-S.2 standard.

FIG. 17 is a block diagram illustrating a fourth embodiment of the frame synchronization circuit shown in FIG. 7.

FIG. 18 is a block diagram illustrating a configuration example of a personal computer.

EXPLANATION OF REFERENCE NUMERALS

101: Decoder, 113: Phase synchronization circuit, 114: Frame synchronization circuit, 115: Error correction decoding circuit, 151: Differential correlation detector, 152: Frame period confirmation counter, 153: Selector, 231: Differential calculation section, 232: PLSC correlation calculation section, 233: SOF correlation calculation section, 234: Adder, 241: Complex conjugate calculator, 242: Delayer, 243: Multiplier, 251: Delayer, 252: Multiplier, 253: Adder, 261: Delayer, 262: Multiplier, 263: Adder, 301: Frame period confirmation counter, 302: Selector, 321: RM code decoding section, 322: PLSC lock determination section, 341: RM code decoding section

BEST MODE FOR CARRYING OUT THE INVENTION

A description will be given below of the embodiments to which the present invention is applied with reference to the accompanying drawings.

Figure 7:
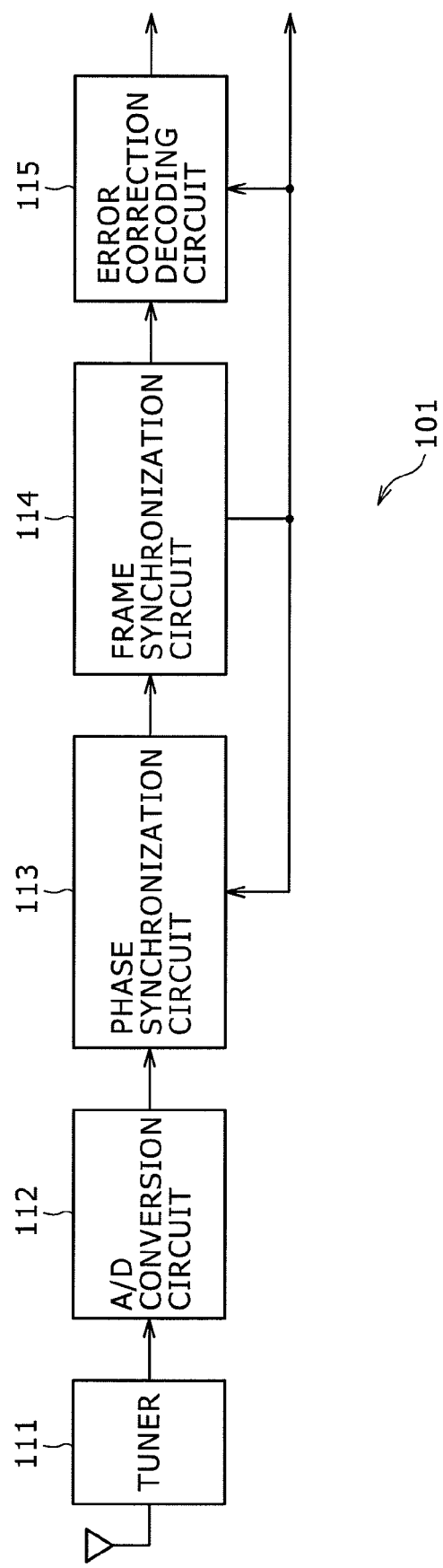
FIG. 7 is a block diagram illustrating an embodiment of a demodulator to which the present invention is applied.

FIG. 7 is a block diagram illustrating an embodiment of a demodulator to which the present invention is applied. A demodulator 101 shown in FIG. 7 receives and demodulates, for example, a broadcast signal compliant with the DVB-S.2 standard (hereinafter also referred to as the input signal).

The demodulator 101 includes a tuner 111, an A/D conversion circuit 112, a phase synchronization circuit 113, a frame synchronization circuit 114, and an error correction decoding circuit 115.

The tuner 111 receives the input signal compliant with the DVB-S.2 standard and supplies the received signal to the A/D conversion circuit 112.

The A/D conversion circuit 112 A/D converts the analog input signal into a digital signal and supplies the signal to the phase synchronization circuit 113.

The phase synchronization circuit 113 corrects the phase error of each symbol of the input signal and supplies the signal to the frame synchronization circuit 114.

The frame synchronization circuit 114 performs synchronization control of the input signal on a frame-by-frame basis and supplies information indicating, for example, the frame synchronization status to the phase synchronization circuit 113, error correction decoding circuit 115 and other circuits of the unshown demodulator 101. Further, the frame synchronization circuit 114 supplies the input signal, supplied in an "as-is" condition from the phase synchronization circuit 113, to the error correction decoding circuit 115.

The error correction decoding circuit 115 subjects the input signal to the error correction process (FEC (Forward Error Correction)) including LDPC code decoding and BCH code decoding. The same circuit 115 outputs the TS (transport stream) packet obtained from the decoding process to the subsequent device.

Figure 8:
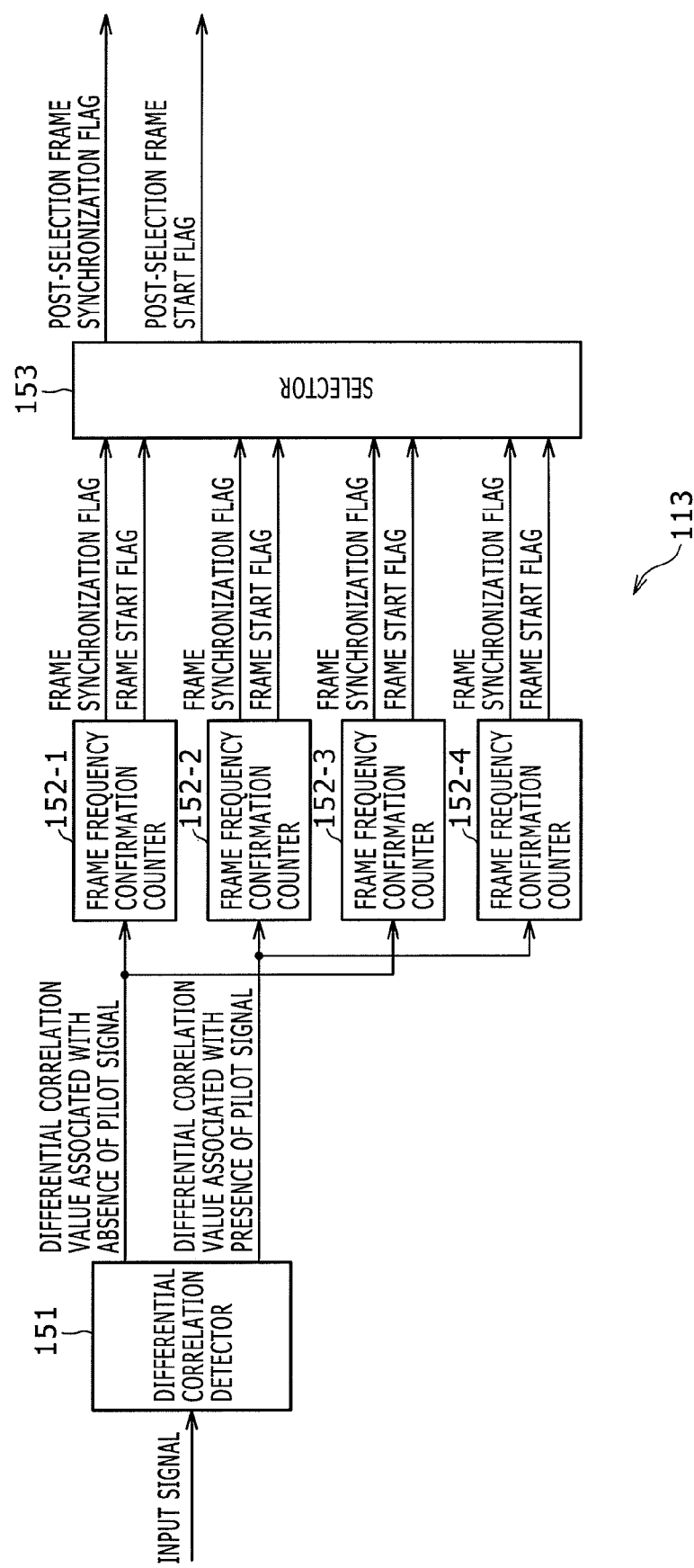
FIG. 8 is a block diagram illustrating a first embodiment of a frame synchronization circuit shown in FIG. 7.

FIG. 8 is a block diagram illustrating a first embodiment of the frame synchronization circuit 114 shown in FIG. 7. The frame synchronization circuit 114 includes a differential correlation detector 151, frame period confirmation counters 152-1 to 152-4, and selector 153.

The differential correlation detector 151 calculates the differential value between each symbol of the input signal and its previous symbol and calculates a differential correlation value indicating the correlation between the differential sequence of the input signal (reception differential sequence) and the PLSC and SOF differential sequences, as will be described later with reference to FIG. 9.

It should be noted that the differential correlation detector 151 calculates a differential correlation value for the absence of a pilot signal inserted in the input signal (hereinafter also referred to as the differential correlation value with no pilot) and another differential correlation value for the presence of a pilot signal inserted in the input signal (hereinafter also referred to as the differential correlation value with a pilot). The differential correlation detector 151 supplies the differential correlation value with no pilot to the frame period confirmation counters 152-1 and 152-3 and the differential correlation value with a pilot to the frame period confirmation counters 152-2 and 152-4.

The frame period confirmation counter 152-1 performs, based on the differential correlation value for the absence of a pilot signal, frame synchronization control appropriate to the case in which the frame length L of each frame in the input signal is 21690 symbols, that is, the case in which the main signal of the input signal is modulated using 8PSK with no pilot signal inserted, as will be described later with reference to FIG. 11. The frame period confirmation counter 152-1 supplies a frame synchronization flag, which is a signal indicating the presence or absence of frame synchronization establishment, and a frame start flag, which is a synchronization signal indicating the start timing of a frame and synchronous with the frame, to the selector 153.

The frame period confirmation counter 152-2 performs, based on the differential correlation value for the presence of a pilot signal, frame synchronization control appropriate to the case in which the frame length L of each frame in the input signal is 22194 symbols, that is, the case in which the main signal of the input signal is modulated using 8PSK with a pilot signal inserted, as will be described later with reference to FIG. 11. The frame period confirmation counter 152-2 supplies a frame synchronization flag indicating the presence or absence of frame synchronization establishment and a frame start flag indicating the start timing of a frame to the selector 153.

The frame period confirmation counter 152-3 performs, based on the differential correlation value for the absence of a pilot signal, frame synchronization control appropriate to the case in which the frame length L of each frame in the input signal is 32490 symbols, that is, the case in which the main signal of the input signal is modulated using QPSK with no pilot signal inserted, as will be described later with reference to FIG. 11. The frame period confirmation counter 152-3 supplies a frame synchronization flag indicating the presence or absence of frame synchronization establishment and a frame start flag indicating the start timing of a frame to the selector 153.

The frame period confirmation counter 152-4 performs, based on the differential correlation value for the presence of a pilot signal, frame synchronization control appropriate to the case in which the frame length L of each frame in the input signal is 33282 symbols, that is, the case in which the main signal of the input signal is modulated using QPSK with a pilot signal inserted, as will be described later with reference to FIG. 11. The frame period confirmation counter 152-4 supplies a frame synchronization flag indicating the presence or absence of frame synchronization establishment and a frame start flag indicating the start timing of a frame to the selector 153.

It should be noted that the frame period confirmation counters 152-1 to 152-4 will be hereinafter simply referred to as the frame period confirmation counters 152 if there is no need to distinguish between these frame period confirmation counters.

On the other hand, the value of the frame synchronization flag output from each of the frame period confirmation counters is set to "1" to indicate that frame synchronization has been established or to "0" to indicate that frame synchronization has yet to be established. The value of the frame start flag is set to "1" to indicate the frame start timing or "0" to indicate any other timing.

The selector 153 selects, based on predetermined priorities, one of four sets of the frame synchronization flag and frame start flag fed from the frame period confirmation counters 152-1 to 152-4 and supplies the set to the phase synchronization circuit 113, error correction decoding circuit 115 and other circuits of the unshown demodulator 101, as will be described later with reference to FIG. 12.

Figure 5:
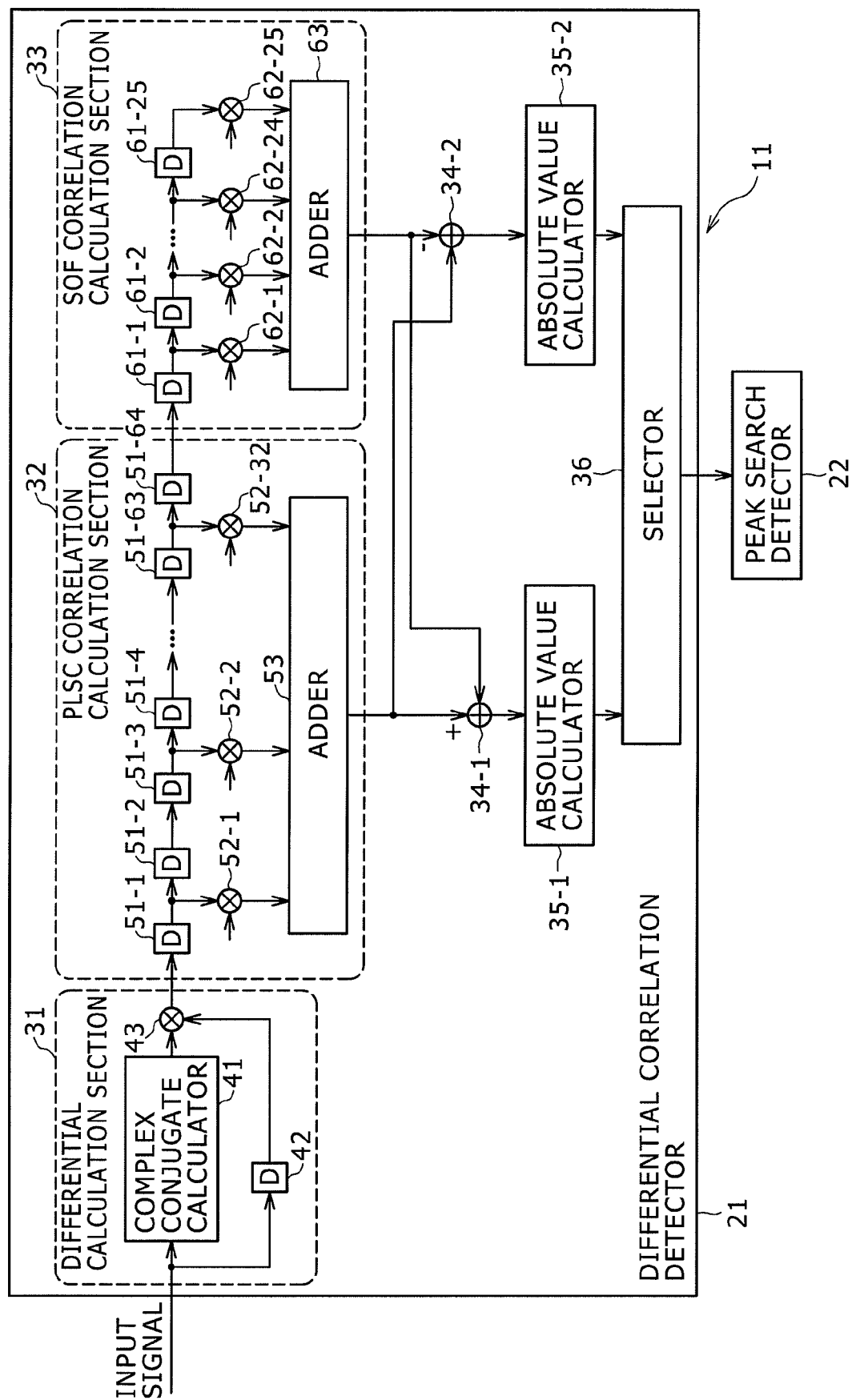
FIG. 5 is a block diagram illustrating a configuration example of a frame synchronization circuit in a demodulation circuit adapted to demodulate a signal compliant with the conventional DVB-S.2 standard.
Figure 6:
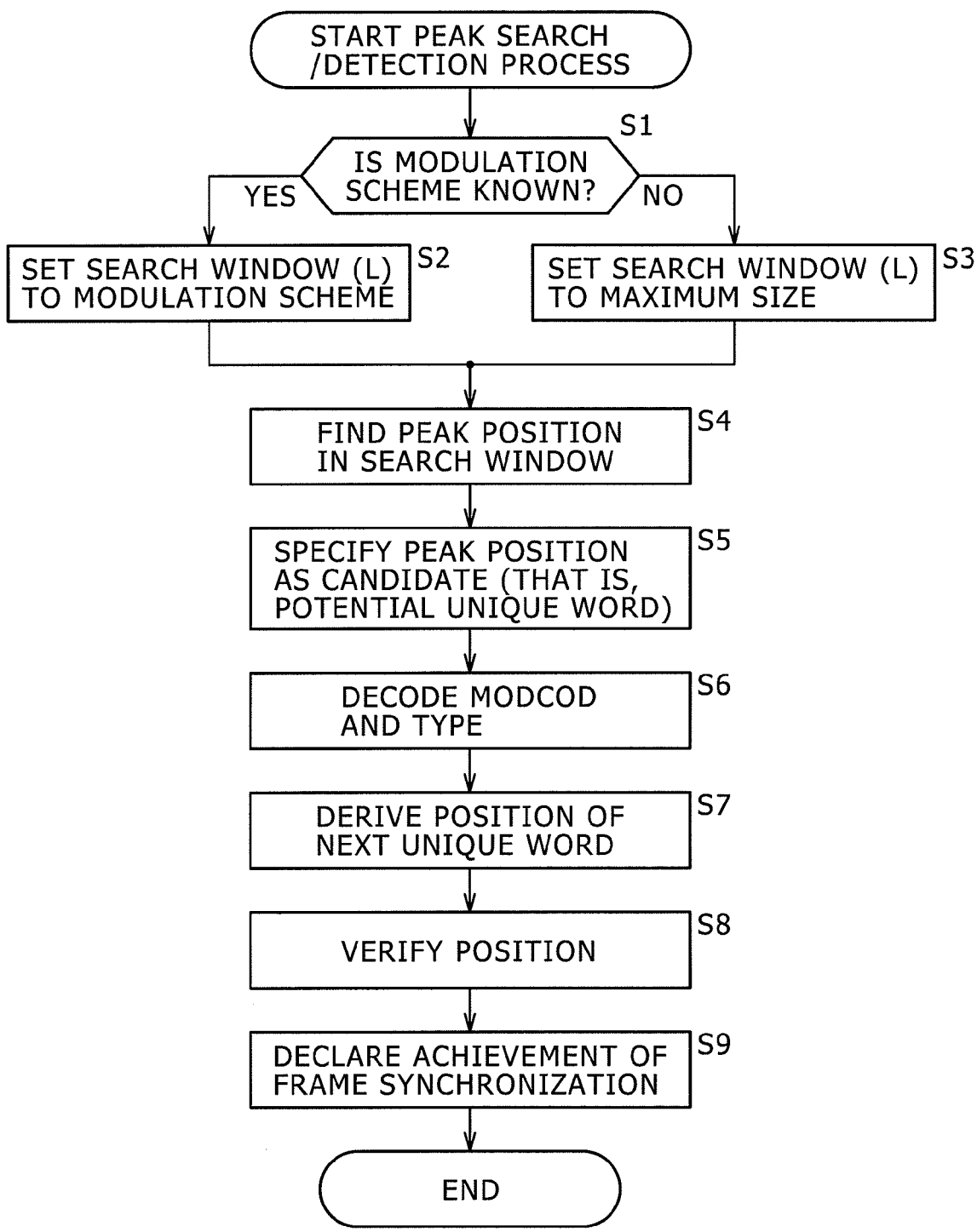
FIG. 6 is a flowchart for describing a peak search/detection process of a conventional frame synchronization circuit.
Figure 9:
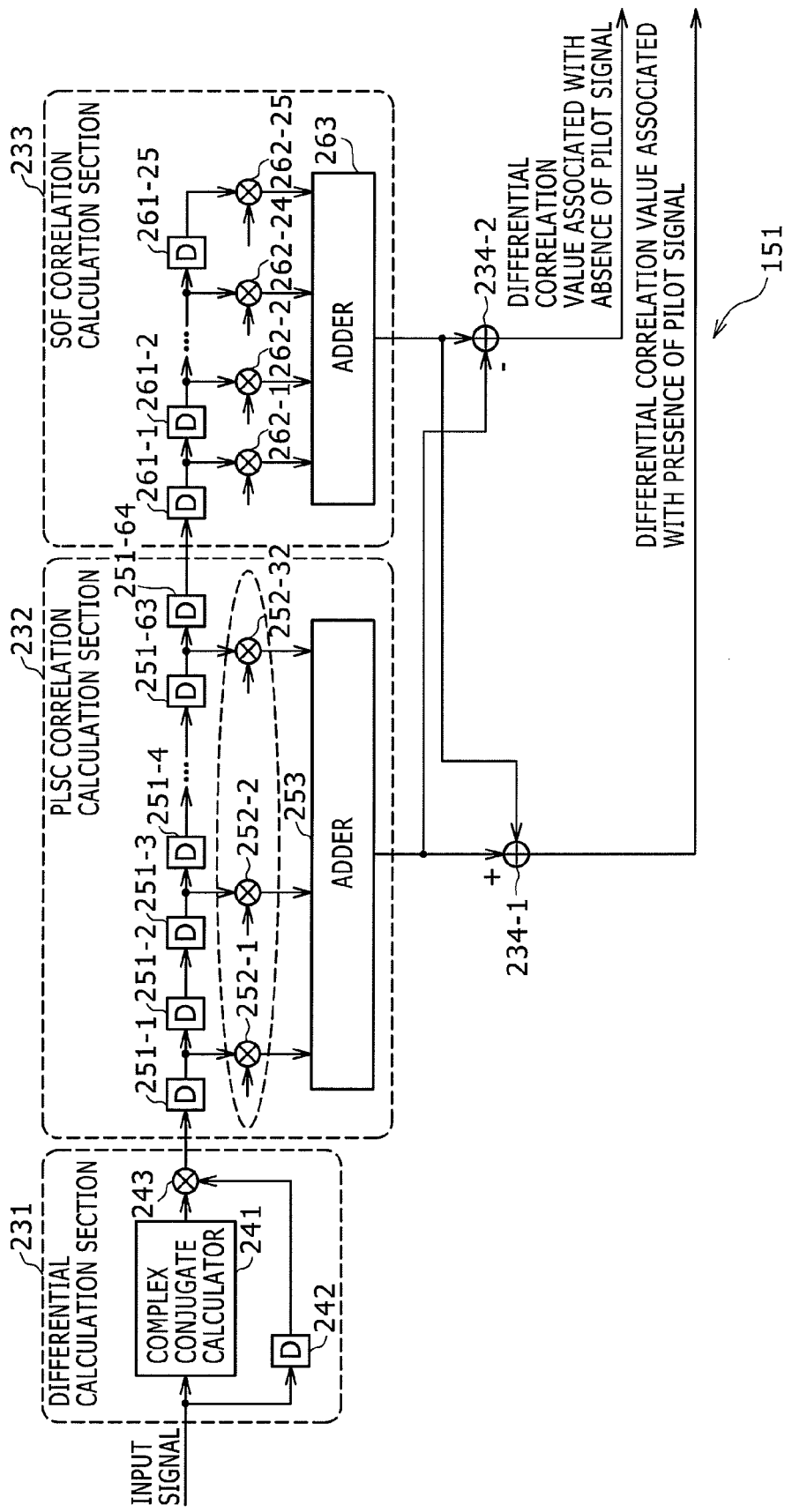
FIG. 9 is a block diagram illustrating a configuration example of a differential correlation detector.

FIG. 9 is a block diagram illustrating a configuration example of the differential correlation detector 151. The same detector 151 includes a differential calculation section 231, PLSC correlation calculation section 232, SOF correlation calculation section 233, and adders 234-1 and 234-2. It should be noted that in FIG. 9 like components as those in FIG. 5 are denoted by the same reference numerals.

The differential calculation section 231 performs differential detection of the input signal and supplies the differential value obtained from the differential detection to the PLSC correlation calculation section 232. The differential calculation section 231 includes a complex conjugate calculator 241, delayer 242, and multiplier 243.

The complex conjugate calculator 241 calculates a complex conjugate of each symbol of the input signal and supplies the complex conjugate to the multiplier 243.

The delayer 242 delays each of the symbols of the input signal by one symbol and supplies the symbol to the multiplier 243.

The multiplier 243 calculates a differential value between adjacent symbols of the input signal by multiplying the complex conjugate of the symbol from the complex conjugate calculator 241 and the previous symbol from the delayer 242. The multiplier 43 supplies the calculated differential value to a delayer 251-1 of the PLSC correlation calculation section 232.

The PLSC correlation calculation section 232 includes delayers 251-1 to 251-64, multipliers 252-1 to 252-32, and an adder 253. It should be noted that the delayers 251-1 to 251-64 and multipliers 252-1 to 252-32 will be hereinafter simply referred to as the delayers 251 and multipliers 252 if there is no specific need to distinguish between these delayers and multipliers.

The delayer 251-1 delays each of the input differential values by one symbol and supplies the differential value to the delayer 251-2 at the subsequent stage and to the multiplier 252-1.

The delayer 251-2 delays each of the input differential values by one symbol and supplies the differential value to the delayer 251-3 at the subsequent stage.

The delayer 251-3 delays each of the input differential values by one symbol and supplies the differential value to the delayer 251-4 at the subsequent stage and to the multiplier 252-2.

The rest is the same as the above. Each of the odd-numbered delayers 251 from the beginning of the PLSC correlation calculation section 232 delays each of the input differential values by one symbol and supplies the differential value to the delayer 251 at the subsequent stage and to the multiplier 252. On the other hand, each of the even-numbered delayers 251 from the beginning of the PLSC correlation calculation section 232 other than the delayer 251-64 delays each of the input differential values by one symbol and supplies the differential value to the delayer 251 at the subsequent stage. Further, the delayer 251-64 delays each of the input differential values by one symbol and supplies the differential value to a delayer 261-1 of the SOF correlation calculation section 233.

The multipliers 252-1 to 252-32 calculate, every other symbol, a correlation value indicating the symbol-to-symbol correlation between the differential sequence of the input signal, i.e., the reception differential sequence and the PLSC differential sequence. More specifically, the multiplier 252-32 calculates the correlation value indicating the correlation between each of the symbols of the reception differential sequence and the first symbol of the PLSC differential sequence by multiplying the differential value of the reception differential sequence fed from the delayer 251-63 by the predetermined value associated with the differential value of the first symbol of the PLSC differential sequence. The multiplier 252-31 calculates the correlation value indicating the correlation between each of the symbols of the reception differential sequence and the third symbol of the PLSC differential sequence by multiplying the differential value of the reception differential sequence fed from the delayer 251-61 by the predetermined value associated with the differential value of the third symbol of the PLSC differential sequence. The rest is the same as the above. The multiplier 252-n calculates the correlation value indicating the correlation between each of the symbols of the reception differential sequence and the 65-2 nth symbol of the PLSC differential sequence by multiplying the differential value of the reception differential sequence fed from the delayer 251-(2n−1) by the predetermined value associated with the differential value of the 65-2 nth symbol of the PLSC differential sequence. The multipliers 252-1 to 252-32 supply the calculated correlation values to the adder 53.

The adder 253 adds together the correlation values calculated by the multipliers 252-1 to 252-32 and supplies the sum, i.e., the PLSC correlation value, to the adders 234-1 and 234-2.

It should be noted that the PLSC correlation calculation section 232 calculates the PLSC correlation value indicating the correlation between the PLSC and reception differential sequences if the parameter value of the pilot signal of the TYPE information is "1," that is, if a pilot signal is inserted in the input signal. As described above, the differential values for every other symbol from the beginning of the PLSC differential sequence are all $-j$ ($=e^{-j\pi/2}$) if the parameter value of the pilot signal is "0," and are all $j$ ($=e^{j\pi/2}$) if the parameter value of the pilot signal is "1." Thus, the differential values are inverted from each other. Therefore, when the header part of the input signal is fed to the differential correlation detector 151 and the reception differential sequence for the PLSC part of the input signal is fed to the PLSC correlation calculation section 232, the PLSC correlation value is ideally the positive maximum value and negative minimum value respectively if the parameter value of the pilot signal is "1" and "0."

The SOF correlation calculation section 233 includes delayers 261-1 to 261-25, multipliers 262-1 to 262-25, and an adder 263. It should be noted that the delayers 261-1 to 261-25 and multipliers 262-1 to 262-25 will be hereinafter simply referred to as the delayers 261 and multipliers 262 if there is no specific need to distinguish between these delayers and multipliers.

The delayer 261-1 delays each of the input differential values by one symbol and supplies the differential value to the delayer 261-2 at the subsequent stage and to the multiplier 262-1.

The rest is the same as the above. The delayers 261 other than the delayer 261-25 delay each of the input differential values by one symbol and supplies the differential value to the delayer 261 at the subsequent stage and to the multiplier 262. On the other hand, the delayer 261-25 delays each of the input differential values by one symbol and supplies the differential value to the multiplier 262-25.

The multipliers 262-1 to 262-25 calculate, every other symbol, a correlation value indicating the symbol-to-symbol correlation between the differential sequence of the input signal, i.e., the reception differential sequence, and the SOF differential sequence. More specifically, the multiplier 262-25 calculates the correlation value indicating the correlation between each of the symbols of the reception differential sequence and the first symbol of the SOF differential sequence by multiplying the differential value of the reception differential sequence fed from the delayer 261-25 by the predetermined value associated with the differential value of the first symbol of the SOF differential sequence. The multiplier 262-24 calculates the correlation value indicating the correlation between each of the symbols of the reception differential sequence and the second symbol of the SOF differential sequence by multiplying the differential value of the reception differential sequence fed from the delayer 261-24 by the predetermined value associated with the differential value of the second symbol of the SOF differential sequence. The rest is the same as the above. The multiplier 262-m calculates the correlation value indicating the correlation between each of the symbols of the reception differential sequence and the 26-mth symbol of the SOF differential sequence by multiplying the differential value of the reception differential sequence fed from the delayer 261-m by the predetermined value associated with the differential value of the 26-mth symbol of the SOF differential sequence. The multipliers 262-1 to 262-25 supply the calculated correlation values to the adder 263.

The adder 263 adds together the correlation values calculated by the multipliers 262-1 to 262-25 and supplies the sum, i.e., the SOF correlation value, to the adders 234-1 and 234-2.

Therefore, when the header part of the input signal is fed to the differential correlation detector 151 and the reception differential sequence for the SOF part of the input signal is fed to the SOF correlation calculation section 233, the SOF correlation value is ideally the positive maximum value.

The adder 234-1 adds the PLSC and SOF correlation values together and supplies the sum to the frame period confirmation counters 152-2 and 152-4 as the differential correlation value with a pilot. Therefore, the differential correlation value with a pilot indicates the correlation between a known sequence and a reception differential sequence. The known sequence is a symbol string with a known value and includes the PLSC and SOF differential sequences if the parameter value of the pilot signal is "1," that is, if a pilot signal is inserted in the input signal. The reception differential sequence is obtained from differential detection of the input signal. When the header part of the input signal is fed to the differential correlation detector 151 and if the parameter value of the pilot signal is "1," the differential correlation value with a pilot is ideally the positive maximum value.

The adder 234-2 adds together the value, inverted in sign from the PLSC correlation value, and the SOF correlation value and supplies the sum to the frame period confirmation counters 152-1 and 152-3 as the differential correlation value with no pilot. Therefore, the differential correlation value with no pilot indicates the correlation between a known sequence and a reception differential sequence. The known sequence includes the PLSC and SOF differential sequences if the parameter value of the pilot signal is "0," that is, if no pilot signal is inserted in the input signal. The reception differential sequence is obtained by detecting the input signal. When the header part of the input signal is fed to the differential correlation detector 151 and if the parameter value of the pilot signal is "0," the differential correlation value with no pilot is ideally the positive maximum value.

Figure 10:
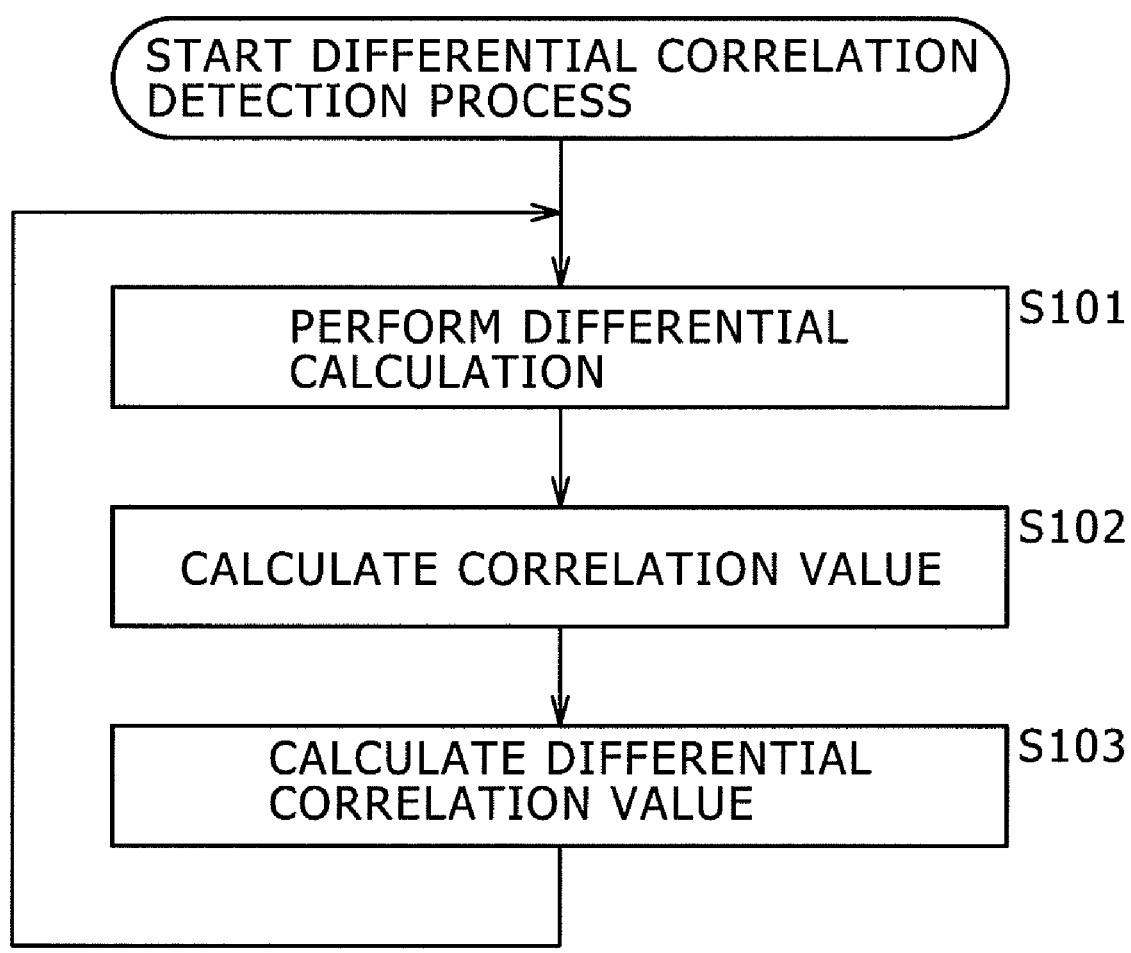
FIG. 10 is a flowchart for describing a differential correlation detection process performed by the differential correlation detector.

A description will be given next of the processes performed by the frame synchronization circuit 114 with reference to FIGS. 10 to 12.

A description will be given first of the differential correlation detection process performed by the differential correlation detector 151 of the frame synchronization circuit 114 with reference to the flowchart in FIG. 10.

In step S101, the differential calculation section 231 performs differential calculation. That is, the differential calculation section 231 calculates a differential value for each of the symbols of the input signal fed from the phase synchronization circuit 113 as described above with reference to FIG. 9 and supplies the calculated differential value to the delayer 251-1 of the PLSC correlation calculation section 232.

In step S102, the PLSC correlation calculation section 232 and SOF correlation calculation section 233 calculate the correlation values. That is, as described with reference to FIG. 9, the PLSC correlation calculation section 232 calculates the PLSC correlation value and supplies the value to the adders 234-1 and 234-2, and the SOF correlation calculation section 233 calculates the SOF correlation value and supplies the value to the adders 234-1 and 234-2.

In step S103, the adders 234-1 and 234-2 calculate the differential correlation values. That is, as described above with reference to FIG. 9, the adder 234-1 adds the PLSC and SOF correlation values together and supplies the sum to the frame period confirmation counters 152-2 and 152-4 as the differential correlation value with a pilot, and the adder 234-2 adds together the value, inverted in sign from the PLSC correlation value, and the SOF correlation value and supplies the sum to the frame period confirmation counters 152-1 and 152-3 as the differential correlation value with no pilot.

Then, the process goes back to step S101, and steps S101 to 5103 are repeated.

A description will be given next, with reference to the flowchart shown in FIG. 11, of the frame synchronization establishment process performed by the frame period confirmation counters 152-1 to 152-4 in response to the differential correlation detection process performed by the differential correlation detector 151 shown in FIG. 10. It should be noted that the flowchart in FIG. 11 shows the process performed by one frame period confirmation counter and that the frame period confirmation counters 152-1 to 152-4 perform the process shown in FIG. 11 in parallel with each other. It should also be noted that this process is initiated, for example, when the differential correlation detector 151 begins to supply the differential correlation value.

In step S121, the frame period confirmation counter 152 retains the differential correlation value fed from the differential correlation detector 151.

In step S122, the frame period confirmation counter 152 determines whether the differential correlation value for the Lth symbol has been input after the previous differential correlation value was retained. If it is determined that the differential correlation value for the Lth symbol has not been input after the previous differential correlation value was retained, the process proceeds to step S123.

In step S123, the frame period confirmation counter 152 determines whether a differential correlation value has been input which is greater than that retained. If it is determined that a differential correlation value has not been input which is greater than that retained, the process returns to step S122. The process in steps S122 and 5123 is repeated until it is determined that the differential correlation value for the Lth symbol has been input after the previous differential correlation value was retained in step S122 or until a differential correlation value has been input which is greater than that retained in step S123.

On the other hand, the process proceeds to step S124 if it is determined in step S123 that a differential correlation value has been input which is greater than that retained, that is, if a differential correlation value has been input which is greater than that retained by the frame period confirmation counter 152 during the associated frame length L after the previous differential correlation value was retained.

In step S124, the frame period confirmation counter 152 decrements the synchronization counter. Next, the process returns to step S121 where the differential correlation value, determined to be greater than that retained, is retained anew, after which the process in step S122 and subsequent steps is performed.

On the other hand, the process proceeds to step S125 if it is determined in step S123 that the differential correlation value for the Lth symbol has been input after the previous differential correlation value was retained, that is, if no differential correlation value has been input which is greater than that retained by the frame period confirmation counter 152 during the associated frame length L after the previous differential correlation value was retained.

In step S125, the frame period confirmation counter 152 increments the synchronization counter.

In step S126, the frame period confirmation counter 152 determines whether the synchronization counter has exceeded the threshold. If it is determined that the synchronization counter has yet to exceed the threshold, the process returns to step S121 where the previous differential correlation value is retained first and then the differential correlation value for the Lth symbol is retained anew, after which the process in step S122 and subsequent steps is performed.

On the other hand, the process proceeds to step S127 if it is determined in step S126 that the synchronization counter has exceeded the threshold, that is, if the frame length L continues to match the peak-to-peak spacing of the correlation value continues for a certain amount of time.

In step S127, the frame period confirmation counter 152 notifies the establishment of frame synchronization and terminates the frame synchronization establishment process. More specifically, the frame period confirmation counter 152 sets the value of the frame synchronization flag to "1" to indicate that frame synchronization has been established. Further, the frame period confirmation counter 152 sets the value of the frame start flag to "1" for a period of one symbol, and then sets the value of the frame start flag to "1" for a period of one symbol each time L symbols elapse. That is, the frame start flag is set to "1" each time the frame header part is fed to the differential correlation detector 151.

A description will be given next, with reference to the flowchart shown in FIG. 12, of the output selection process performed by the selector 153 in response to the frame synchronization establishment process performed by the frame period confirmation counter 152 shown in FIG. 11.

In step S141, the selector 153 selects the information to be output. More specifically, if only one of the frame period confirmation counters 152 has the value of the frame synchronization flag set to "1," the selector 153 selects the frame synchronization flag and frame start flag output from the frame period confirmation counter 152. The selector 153 outputs the flags to the phase synchronization circuit 113, error correction decoding circuit 115 and other circuits of the unshown demodulator 101 as a post-selection frame synchronization flag and post-selection frame start flag.

On the other hand, if the plurality of frame period confirmation counters 152 have the value of the frame synchronization flag set to "1," the selector 153 selects, based on the synchronization status management table, one of the frame period confirmation counters 152 and selects the frame synchronization flag and frame start flag output from the selected frame period confirmation counter 152. The selector 153 outputs the flags to the phase synchronization circuit 113, error correction decoding circuit 115 and other circuits of the unshown demodulator 101 as a post-selection frame synchronization flag and post-selection frame start flag.

Here, the synchronization status management table is a table which stipulates the priorities used to select the flags to be output from the four frame period confirmation counters 152 and output the flags to the phase synchronization circuit 113, error correction decoding circuit 115 and other circuits of the unshown demodulator 101.

For example, the synchronization status management table defines that the flags from the frame period confirmation counter 152 associated with the short frame length must be output in priority. That is, the priorities are in the following order: frame period confirmation counters 152-1, 152-2, 152-3, and 152-4. The reason for this is that although normally only one of the frame period confirmation counters 152 has the value of the frame synchronization flag set to "1," in other words, although normally only one of the frame period confirmation counters 152 establishes frame synchronization, the values of the frame synchronization flags from the plurality of frame period confirmation counters 152 may be erroneously "1." In such a case, the frame period confirmation counter 152 associated with the short frame length is considered more reliable in its synchronization status because of the shorter intervals at which the frame synchronization status is updated.

It should be noted that the selector 153 outputs the post-selection frame synchronization flag and post-selection frame start flag whose values are set to "0" if none of the frame period confirmation counters 152 has the value of the frame synchronization flag set to "1."

The selector 153 repeats the process in step S141.

As described above, the frame synchronization control is conducted using a differential correlation value with a pilot and differential correlation value with no pilot. This ensures higher accuracy in frame synchronization and ensures higher reliability in the establishment of frame synchronization than the simple selection of the greater of the absolute values of the sum of and difference between the PLSC and SOF correlation values as is done with the conventional frame synchronization circuit 11 shown in FIG. 5.

Further, there is no need to decode the MODCOD and TYPE information in advance to establish frame synchronization. This allows for faster frame synchronization with more reliability.

Still further, the frame synchronization establishment processes for the different frame lengths are performed in parallel by the four frame period confirmation counters 152. This allows for faster frame synchronization.

Still further, only the single differential correlation detector 151 is used which is large in circuit scale, together with the four frame period confirmation counters 152 which are small in circuit scale. This keeps down the overall circuit scale.

Still further, the phase synchronization circuit 113 can learn the start position of the input signal frame using a frame start flag and treat the SOF as a known sequence, providing improved accuracy in the detection of phase error. In addition, the improved accuracy in the detection of phase error makes it possible to eliminate frequency error quickly and accurately in the carrier frequency synchronization process performed by the phase synchronization circuit 113.

A description will be given next of a second embodiment of the frame synchronization circuit 114 shown in FIG. 7.

Figure 13:
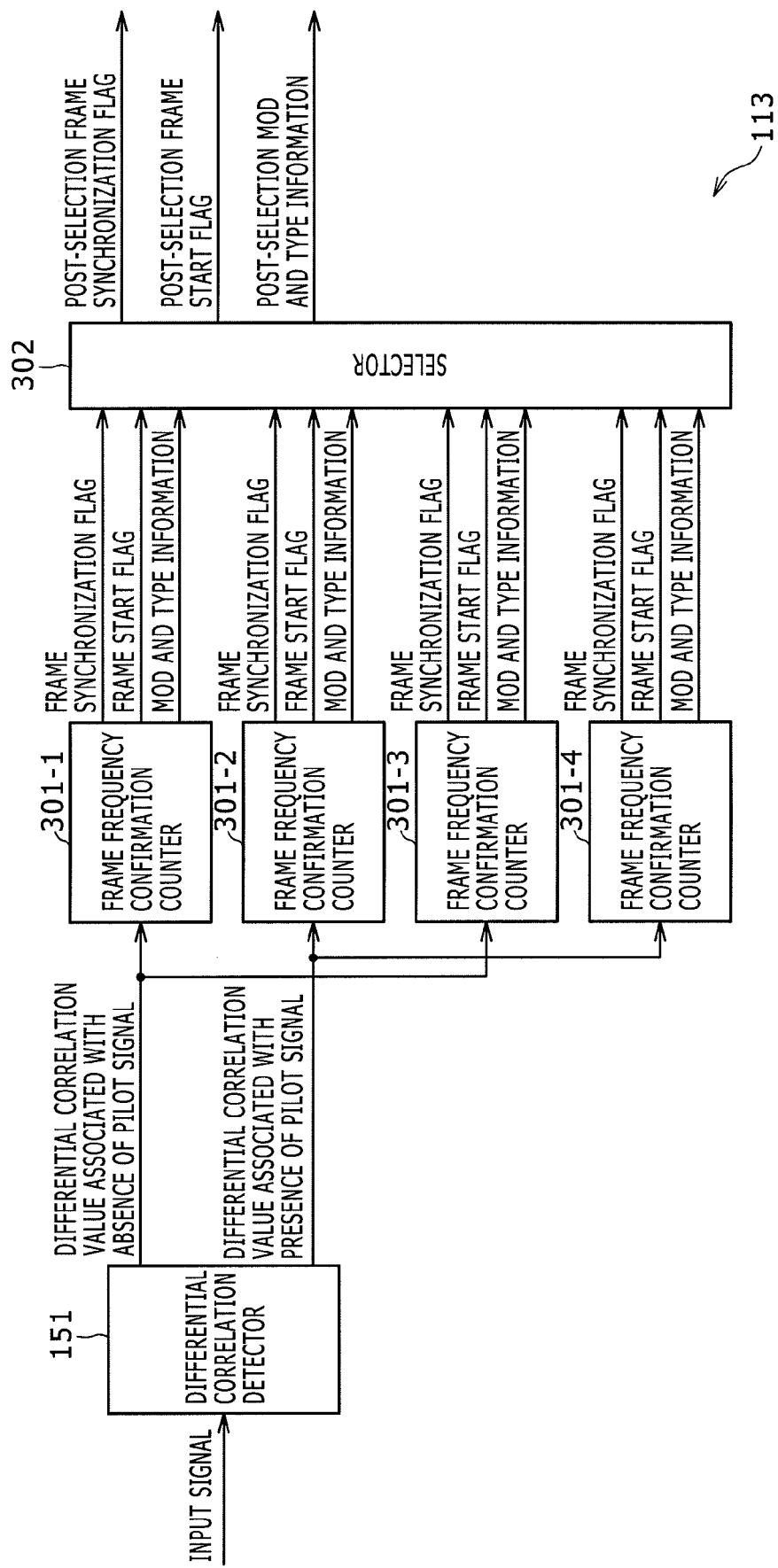
FIG. 13 is a block diagram illustrating a second embodiment of the frame synchronization circuit shown in FIG. 7.

FIG. 13 is a block diagram illustrating the second embodiment of the frame synchronization circuit 114 shown in FIG. 7. The frame synchronization circuit 114 shown in FIG. 13 includes the differential correlation detector 151, frame period confirmation counters 301-1 to 301-4, and a selector 302. It should be noted that in FIG. 13 like components as those in FIG. 8 are denoted by the same reference numerals, and the description thereof will be omitted to avoid redundancy.

The frame period confirmation counters 301-1 to 301-4 differ from the frame period confirmation counters 152-1 to 152-4 shown in FIG. 8 in that these counters supply not only the frame synchronization flags and frame start flags but also MOD and TYPE information to the selector 302.

Figure 1:
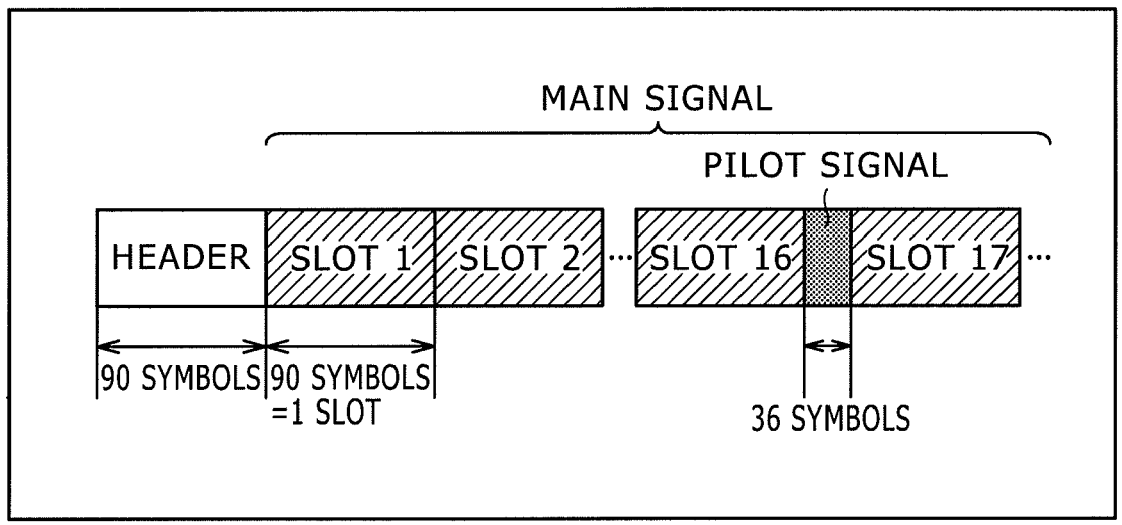
FIG. 1 is a diagram illustrating the configuration of a transmission signal frame in the DVB-S.2 standard.
Figure 2:
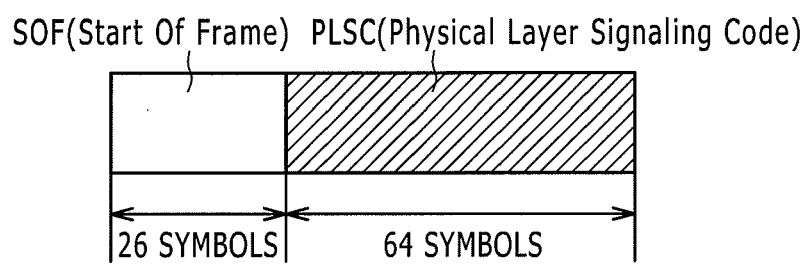
FIG. 2 is a diagram illustrating the configuration of a header of the transmission signal frame in the DVB-S.2 standard.
Figures 3, 4:
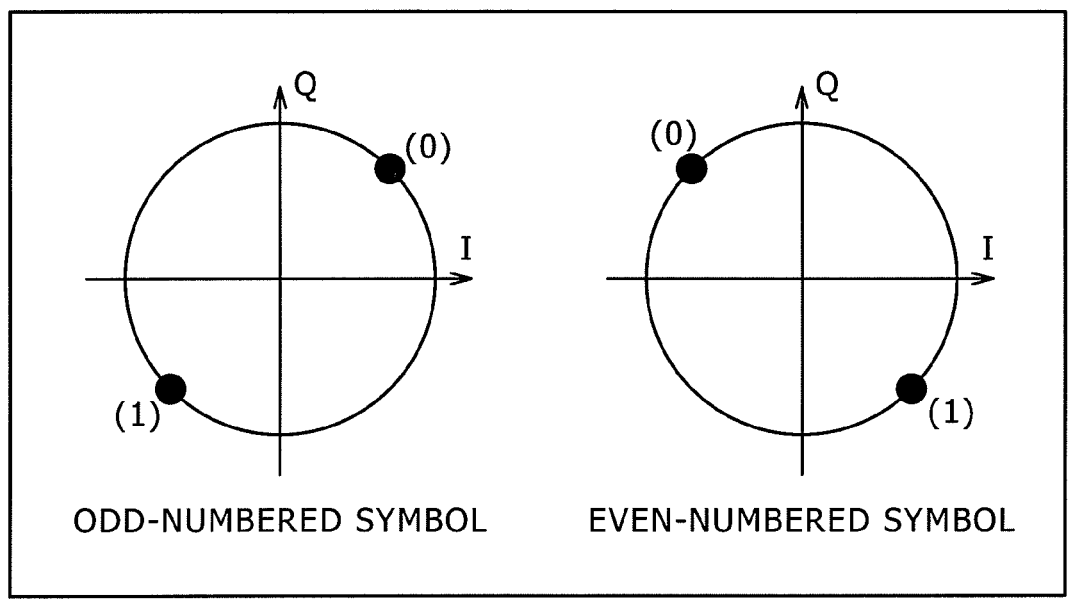
FIG. 3 is a diagram illustrating a mapping pattern of each symbol of the header in the complex plane.
FIG. 4 is a diagram illustrating the types of transmission signal frame lengths in the DVB-S.2 standard.

As described above with reference to FIG. 4, the frame length of the input signal is determined by the modulation scheme (MOD) of the main signal of the input signal and the presence or absence of an inserted pilot signal. Conversely, if the frame length of the input signal can be determined following the establishment of frame synchronization, it is possible to determine the values of the information relating to the modulation scheme (hereinafter referred to as the MOD information) and TYPE information of the MODCOD information inserted in the input signal.

When frame synchronization is established, the frame period confirmation counters 301-1 to 301-4 supply the MOD and TYPE information appropriate to the associated frame length L to the selector 302. That is, the frame period confirmation counter 301-1 supplies, to the selector 302, the MOD information indicating that the modulation scheme of the main signal is 8PSK and the TYPE information indicating that no pilot signal is inserted. The frame period confirmation counter 301-2 supplies, to the selector 302, the MOD information indicating that the modulation scheme of the main signal is 8PSK and the TYPE information indicating that a pilot signal is inserted. The frame period confirmation counter 301-3 supplies, to the selector 302, the MOD information indicating that the modulation scheme of the main signal is QPSK and the TYPE information indicating that no pilot signal is inserted. The frame period confirmation counter 301-4 supplies, to the selector 302, the MOD information indicating that the modulation scheme of the main signal is QPSK and the TYPE information indicating that a pilot signal is inserted.

It should be noted that the frame period confirmation counters 301-1 to 301-4 will be hereinafter simply referred to as the frame period confirmation counters 301 if there is no need to distinguish between these counters.

The selector 302 selects one of four sets of the frame synchronization flag, frame start flag, MOD information and TYPE information fed from the frame period confirmation counters 301-1 to 301-4 and supplies the set to the phase synchronization circuit 113, error correction decoding circuit 115 and other circuits of the unshown demodulator 101 as a post-selection frame synchronization flag, post-selection frame start flag, post-selection MOD information and post-selection TYPE information.

A description will be given next of the process performed by the frame synchronization circuit 114 shown in FIG. 13.

The differential correlation detection process performed by the differential correlation detector 151 shown in FIG. 13 is the same as that performed by the differential correlation detector 151 shown in FIG. 8 described with reference to FIG. 10, and the description thereof will be omitted to avoid redundancy.

Figure 11:
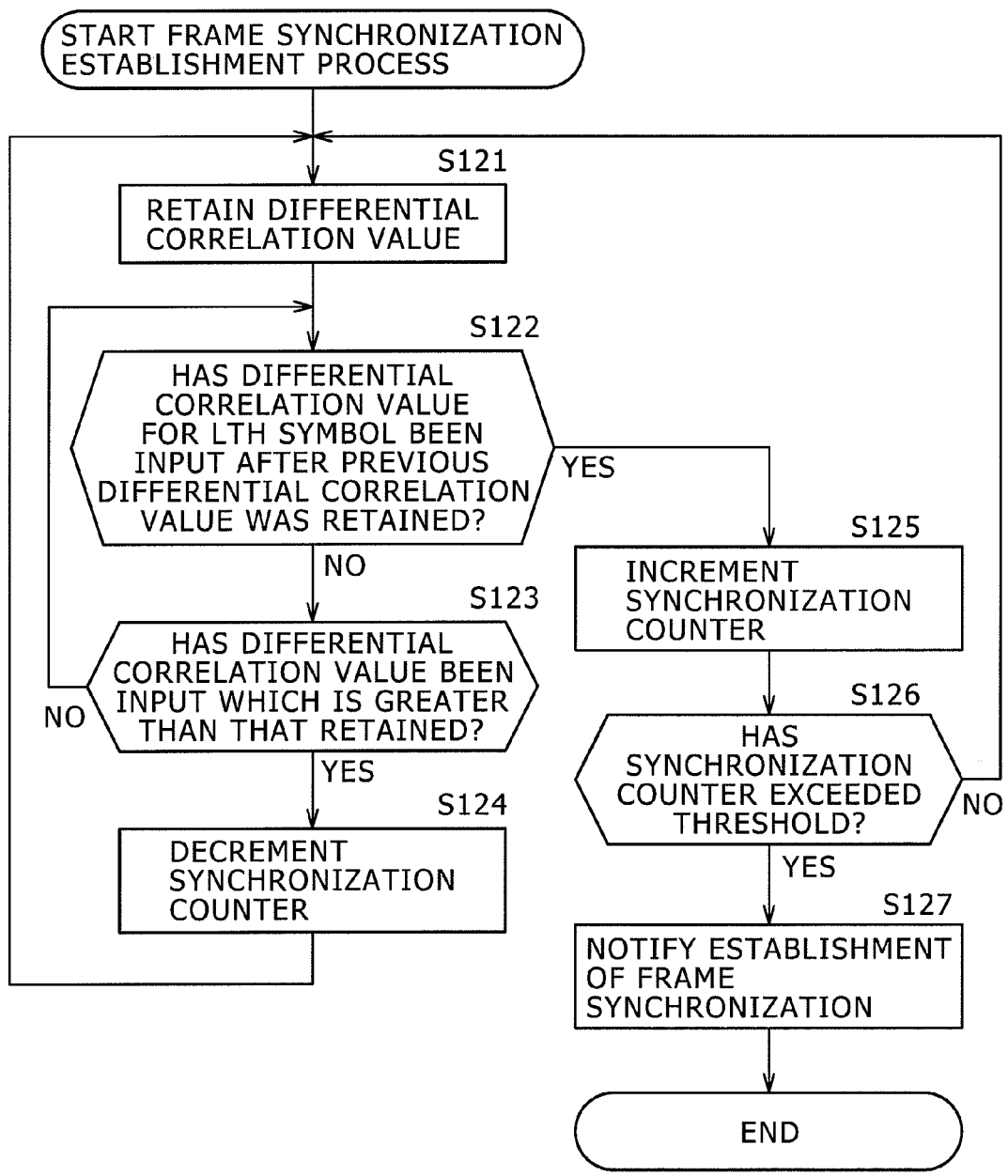
FIG. 11 is a flowchart for describing a frame synchronization establishment process performed by a frame period confirmation counter.

The frame synchronization establishment process performed by the frame period confirmation counters 301 shown in FIG. 13 is conducted based on the flowchart shown in FIG. 11 as with that performed by the frame period confirmation counters 152 shown in FIG. 8.

It should be noted that the frame synchronization establishment process performed by the frame period confirmation counters 301 differs from that performed by the frame period confirmation counters 152 in the process performed in step S127.

That is, in step S127, the frame period confirmation counter 301 sets the value of the frame synchronization flag to "1," sets the value of the frame synchronization flag to "1" to indicate that frame synchronization has been established, and sets the value of the frame start flag to "1" for a period of one symbol. Then, the frame period confirmation counter 301 sets the value of the frame start flag to "1" for a period of one symbol each time L symbols elapse and begin to supply the MOD and TYPE information appropriate to the associated frame length L.

Figure 12:
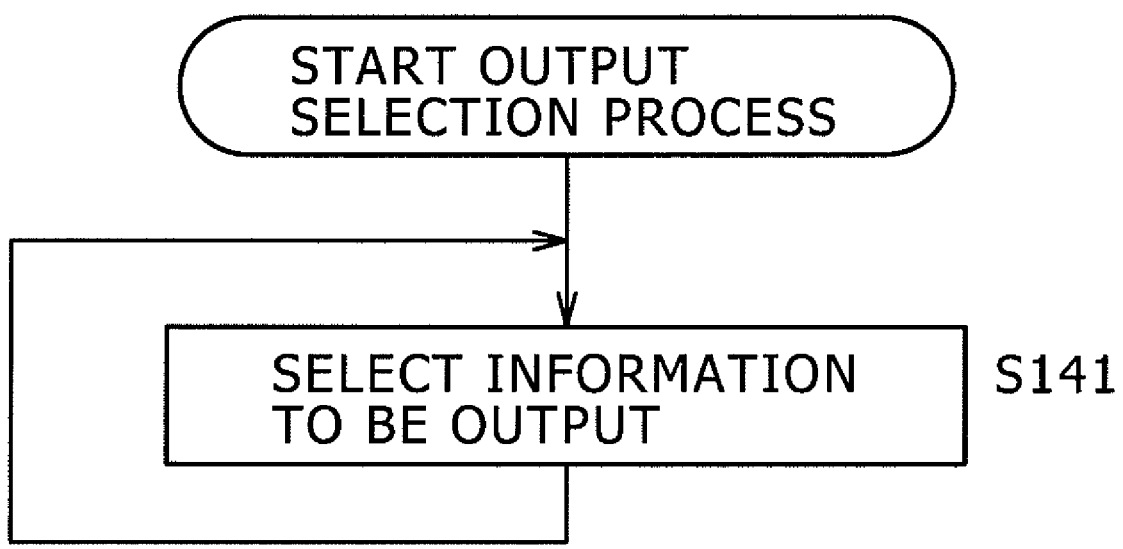
FIG. 12 is a flowchart for describing an output selection process performed by a selector.

On the other hand, the output selection process performed by the selector 302 shown in FIG. 13 is conducted based on the flowchart shown in FIG. 12 as with that performed by the selector 153 shown in FIG. 8.

That is, in step S141, the selector 302 outputs, based on the synchronization status management table, the frame synchronization flag, frame start flag, MOD information and TYPE information output from the selected frame period confirmation counter 152 to the phase synchronization circuit 113, error correction decoding circuit 115, and other circuits of the unshown demodulator 101 as a post-selection frame synchronization flag, post-selection frame start flag, post-selection MOD information and post-selection TYPE information.

As described above, it is possible to establish frame synchronization and obtain MOD and TYPE information of the input signal, for example, even if the frequency offset is large to such an extent that the RM code of the PLSC cannot be decoded.

Further, the phase synchronization circuit 113 can learn the presence or absence of an inserted pilot signal based on the TYPE information. If a pilot signal is inserted, the phase synchronization circuit 113 can treat the pilot signal as a known sequence, providing improved accuracy in the detection of phase error. Further, the phase synchronization circuit 113 can treat the main signal as a PSK symbol of the modulation scheme indicated by the MOD information, providing further improved accuracy in the detection of phase error. In addition, the improved accuracy in the detection of phase error makes it possible to eliminate frequency error quickly and accurately in the carrier frequency synchronization process performed by the phase synchronization circuit 113. Further, in addition to the above, phase synchronization can be established more quickly by adjusting the different parameters of the phase synchronization circuit 113 to their optimal values according to the MOD and TYPE information.

Further, the number of known symbols per frame can be determined as illustrated in FIG. 14 based on the MOD and TYPE information. That is, the number of known symbols per frame is 2070 symbols when the main signal is modulated by QPSK with an inserted pilot signal. The number is 90 symbols when the main signal is modulated by QPSK with no inserted pilot signal. The number is 1350 symbols when the main signal is modulated by 8PSK with an inserted pilot signal. The number is 90 symbols when the main signal is modulated by 8PSK with no inserted pilot signal.

In addition, if the input signal is processed using a known symbol, the fact that the quantity of known symbols (number of known symbols) inserted in each frame can be determined may make it possible to adaptively change processes to be performed on the input signal depending on the quantity of known symbols. For example, if an arithmetic operation is performed using a given quantity or more of known symbols, it is possible to adaptively change the number of frames over which the process will be continued, keeping the amount of processing to a minimum.

More specifically, for example, in order for an unshown CSI (Channel State Information) calculation circuit of the demodulator 101 to calculate the CSI with high accuracy, the amount of noise must be calculated using a given quantity or more of known symbols. Assuming, for example, that the CSI can be calculated with sufficiently high accuracy using 10000 known symbols, it is possible to determine the number of frames over which the CSI process should be continued to find the CSI with sufficiently high accuracy by learning, based on the MOD and TYPE information, the number of known symbols per frame. For example, when the main signal is modulated by QPSK with an inserted pilot signal, the number of known symbols per frame is 2070, making it possible to determine that the CSI process should be continued over five frames.

On the other hand, if the number of known symbols per frame is unknown, it is necessary to perform the CSI calculation process assuming the least number of known symbols per frame in order to obtain the CSI with sufficiently high accuracy. More specifically, it is necessary to continue the CSI calculation process over 112 frames assuming that the number of known symbols per frame is 90.

A description will be given next of a third embodiment of the frame synchronization circuit 114 shown in FIG. 7.

Figure 15:
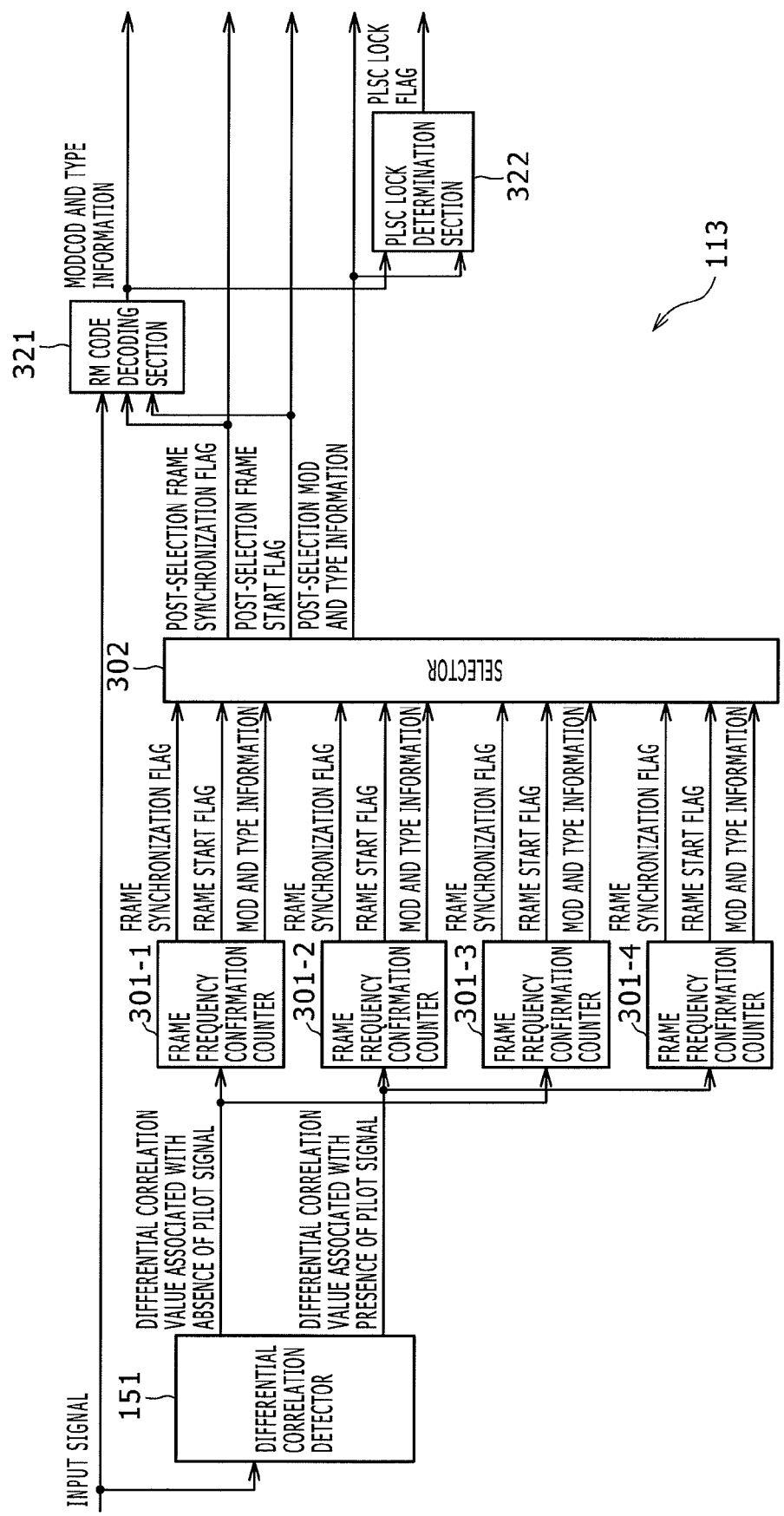
FIG. 15 is a block diagram illustrating a third embodiment of the frame synchronization circuit shown in FIG. 7. p [FIG. 16]

FIG. 15 is a block diagram illustrating the third embodiment of the frame synchronization circuit 114 shown in FIG. 7. The frame synchronization circuit 114 shown in FIG. 15 includes the differential correlation detector 151, frame period confirmation counters 301-1 to 301-4, selector 302, an RM code decoding section 321 and PLSC lock determination section 322. It should be noted that in FIG. 15 like components as those in FIG. 13 are denoted by the same reference numerals, and the description thereof will be omitted to avoid redundancy.

The RM code decoding section 321 receives the input signal and obtains the post-selection frame synchronization flag and post-selection frame start flag from the selector 302. The RM code decoding section 321 detects the beginning of each frame of the input signal based on the post-selection frame start flag and extracts the MODCOD and TYPE information from the input signal by decoding the (64,7) RM code of the PLSC contained in the header at the beginning of each frame of the input signal. The RM code decoding section 321 supplies the extracted MODCOD and TYPE information to the PLSC lock determination section 322, phase synchronization circuit 113, error correction decoding circuit 115, and other circuits of the unshown demodulator 101.

The PLSC lock determination section 322 determines the degree of reliability of the MODCOD and TYPE information output from the RM code decoding section 321 based on the post-selection MOD information and post-selection TYPE information and the MODCOD and TYPE information from the RM code decoding section 321. The PLSC lock determination section 322 supplies the PLSC lock flag indicating the determination result to the phase synchronization circuit 113, error correction decoding circuit 115, and other circuits of the unshown demodulator 101.

It should be noted that the value of the PLSC lock flag will be hereinafter set either to "1" to indicate that the degree of reliability of the MODCOD and TYPE information is sufficient or to "0" to indicate that the degree of reliability of the MODCOD and TYPE information is not sufficient. On the other hand, the state in which the value of the PLSC flag is set to "1" as a result of the determination that the degree of reliability of the MODCOD and TYPE information is sufficient will be hereinafter referred to as the "PLSC lock established" state.

A description will be given next of the process performed by the frame synchronization circuit 114 shown in FIG. 15. It should be noted that, as compared to the frame synchronization circuit 114 shown in FIG. 13, the frame synchronization circuit 114 shown in FIG. 15 performs PLSC lock determination process, in addition to the differential correlation detection process (FIG. 10), frame synchronization establishment process (FIG. 11) and output selection process (FIG. 12) described above.

Here, a description will be given, with reference to the flowchart shown in FIG. 16, of the PLSC lock determination process performed by the RM code decoding section 321 and PLSC lock determination section 322 shown in FIG. 15 in response to the output selection process shown in FIG. 12 performed by the selector 302.

In step S161, the RM code decoding section 321 determines whether the frame start flag has been input. If the value of the post-selection frame start flag from the selector 302 is "0," the RM code decoding section 321 determines that no frame start flag has been input and repeats the process in step S1.

On the other hand, if the value of the post-selection frame start flag from the selector 302 is "1" in step S161, the RM code decoding section 321 determines that the frame start flag has been input. This causes the process to proceed to step S162.

In step S162, the RM code decoding section 321 extracts the MODCOD and TYPE information. More specifically, the RM code decoding section 321 detects the beginning of the frame of the input signal based on the post-selection frame start flag from the selector 302. The RM code decoding section 321 extracts the MODCOD and TYPE information from the input signal by decoding the (64,7) RM code of the PLSC contained in the header at the beginning of the frame of the input signal. The RM code decoding section 321 supplies the extracted MODCOD and TYPE information to the PLSC lock determination section 322, phase synchronization circuit 113, error correction decoding circuit 115 and other circuits of the unshown demodulator 101.

In step S163, the PLSC lock determination section 322 determines whether the post-selection MOD and TYPE information is consistent with the extracted MODCOD and TYPE information. The PLSC lock determination section 322 determines that the post-selection MOD and TYPE information is not consistent with the extracted MODCOD and TYPE information unless the modulation scheme of an input signal and presence or absence of an inserted pilot signal indicated by the post-selection MOD and TYPE information matches the modulation scheme of an input signal and presence or absence of an inserted pilot signal indicated by the MOD-COD and TYPE information extracted from an input signal. This causes the process to proceed to step S164.

In step S164, the PLSC lock determination section 322 decrements the synchronization counter.

Then, the process returns to step S161 from where the process in step S161 and subsequent steps is performed.

On the other hand, if, in step S163, the modulation scheme of an input signal and presence or absence of an inserted pilot signal indicated by the post-selection MOD and TYPE information matches the modulation scheme of an input signal and presence or absence of an inserted pilot signal indicated by the extracted MODCOD and TYPE information, the PLSC lock determination section 322 determines that the post-selection MOD and TYPE information is consistent with the extracted MODCOD and TYPE information. This causes the process to proceed to step S165.

In step S165, the PLSC lock determination section 322 increments the synchronization counter.

In step S166, the PLSC lock determination section 322 determines whether the synchronization counter has exceeded the threshold. If it is determined that the synchronization counter has yet to exceed the threshold, the process returns to step S161 from where the process in step S161 to S166 is repeated until it is determined that the synchronization counter has exceeded the threshold in step S166.

On the other hand, if it is determined in step S166 that the synchronization counter has exceeded the threshold, that is, if the post-selection MOD and TYPE information continues to be consistent with the MODCOD and TYPE information extracted from the input signal for a certain amount of time, the process proceeds to step S167.

In step S167, the PLSC lock determination section 322 notifies the establishment of PLSC lock and terminates the PLSC lock determination process. That is, the PLSC lock determination section 322 changes the value of the PLSC lock flag from "0" to "1," notifying the establishment of PLSC lock to the phase synchronization circuit 113, error correction decoding circuit 115 and other circuits of the unshown demodulator 101.

When PLSC lock is established, other circuits of the unshown demodulator 101 such as the phase synchronization circuit 113 and error correction decoding circuit 115 use the MODCOD and TYPE information output from the RM code decoding section 321 for the processes including carrier synchronization, CSI calculation and channel equalization as sufficiently reliable information.

For example, when PLSC lock is established, it is possible to use the PLSC of the input signal as a known sequence by re-encoding the MODCOD and TYPE information into (64, 7) RM code and modulating the encoded information by $\pi/2$ shift BPSK, based on the assumption that the MODCOD and TYPE information is reliable. On the other hand, if PLSC lock is not established, it is possible to avoid the demodulation process from malfunctioning as a result of use of the wrong MODCOD and TYPE information by not treating the PLSC of the input signal as a known sequence.

A description will be given next of a fourth embodiment of the frame synchronization circuit 114 shown in FIG. 7.

FIG. 17 is a block diagram illustrating the fourth embodiment of the frame synchronization circuit 114 shown in FIG. 7. The frame synchronization circuit 114 shown in FIG. 17 includes the differential correlation detector 151, frame period confirmation counters 301-1 to 301-4, selector 302, PLSC lock determination section 322 and an RM code decoding section 341. It should be noted that in FIG. 17 like components as those in FIG. 15 are denoted by the same reference numerals, and the description thereof will be omitted to avoid redundancy.

The RM code decoding section 341 receives the input signal and obtains the post-selection frame synchronization flag, post-selection frame start flag and post-selection MOD and TYPE information from the selector 302.

Incidentally, of the 7-bit transmission parameter contained in the PLSC of the input signal, the six higher-order bits are coded into (32,6) RM code, except for the LSB (pilot signal parameter) of the TYPE information. The RM code decoding section 341 detects the beginning of each frame of the input signal based on the post-selection frame start flag and extracts MSB frame length parameters of the MODCOD and TYPE information from the input signal by decoding the (32,6) RM code of the PLSC contained in the header at the beginning of each frame of the input signal using the parameter value of the pilot signal in the post-selection TYPE information. The RM code decoding section 341 supplies the extracted MDOCOD information and the TYPE information, which is a combination of the frame length parameter of the extracted TYPE information and the pilot signal parameter of the post-selection TYPE information, to the PLSC lock determination section 322, phase synchronization circuit 113, error correction decoding circuit 115 and other circuits of the unshown demodulator 101.

A description will be given next of the process performed by the frame synchronization circuit 114 shown in FIG. 17. It should be noted that the process performed by the frame synchronization circuit 114 shown in FIG. 17 is the same as that performed by the frame synchronization circuit 114 shown in FIG. 15 in the differential correlation detection process (FIG. 10), frame synchronization establishment process (FIG. 11) and output selection process (FIG. 12) described above, but different only in the PLSC lock determination process.

Figure 16:
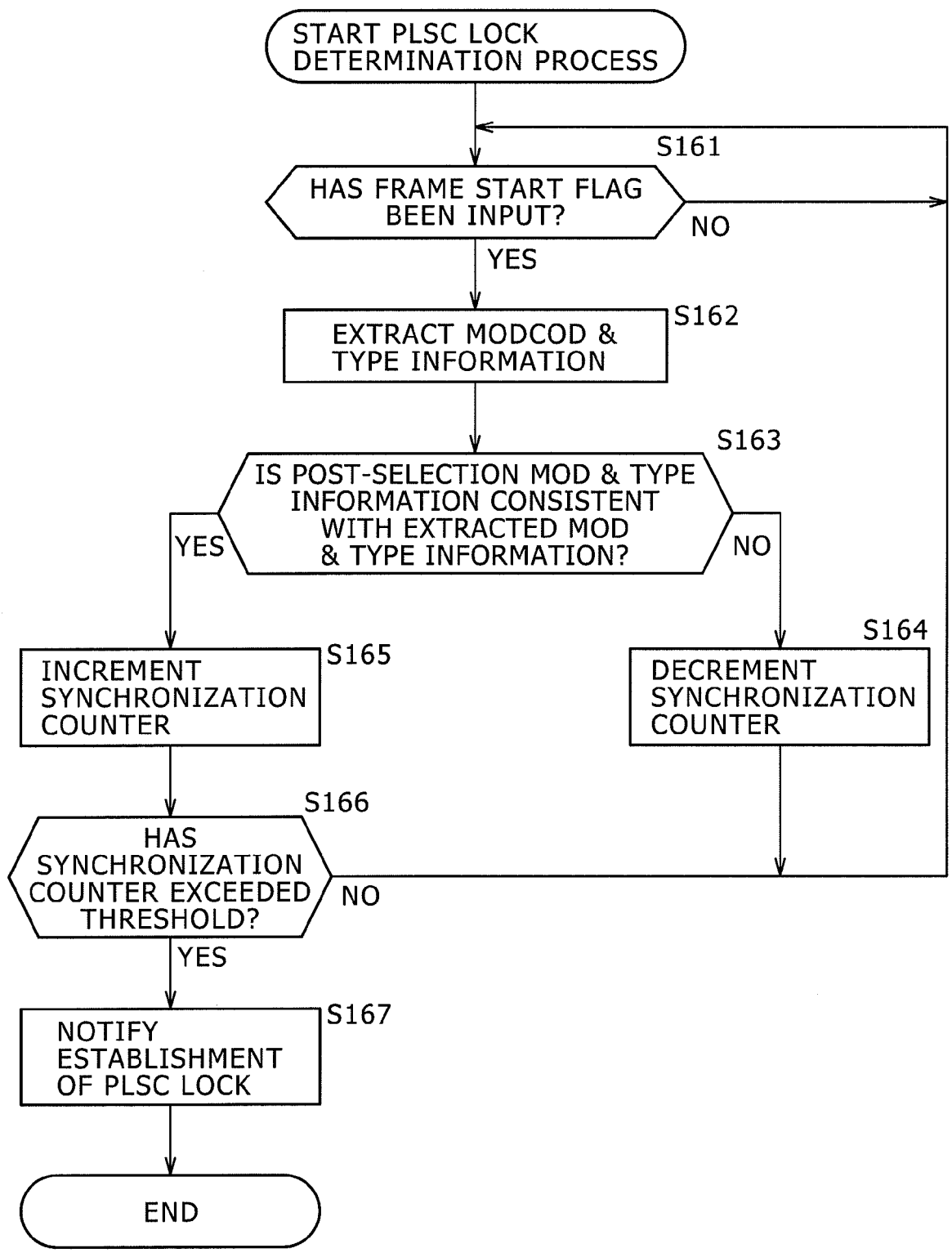
FIG. 16 is a flowchart for describing a PLSC lock determination process performed by the frame synchronization circuit shown in FIG. 15.

The PLSC lock determination process performed by the RM code decoding section 341 and PLSC lock determination section 322 shown in FIG. 17 is conducted based on the flowchart shown in FIG. 16 as with the PLSC lock determination process performed by the RM code decoding section 321 and PLSC lock determination section 322 shown in FIG. 15.

It should be noted that the PLSC lock determination process performed by the RM code decoding section 341 and PLSC lock determination section 322 shown in FIG. 17 differs in the process of step S162 from the PLSC lock determination process performed by the RM code decoding section 321 and PLSC lock determination section 322 shown in FIG. 15.

That is, in step S162, the RM code decoding section 341 detects the beginning of the frame of the input signal based on the post-selection frame start flag from the selector 302. The RM code decoding section 321 extracts the MODCOD information and the frame length parameter of the TYPE information from the input signal by decoding the (32,6) RM code of the PLSC contained in the header at the beginning of the frame of the input signal using the parameter value of the pilot signal in the post-selection TYPE information from the selector 302. The RM code decoding section 341 supplies the extracted MDOCOD information and the TYPE information, which is a combination of the frame length parameter of the extracted TYPE information and the pilot signal parameter of the post-selection TYPE information, to the PLSC lock determination section 322, phase synchronization circuit 113, error correction decoding circuit 115 and other circuits of the unshown demodulator 101.

As described above, the MODCOD and TYPE information can be decoded in a simplified manner. Further, in general, the circuit adapted to decode the (32,6) RM code can be reduced in scale as compared to the circuit adapted to decode the (64,7) RM code. Therefore, the fourth embodiment of the frame synchronization circuit 114 permits reduction in scale of the circuit adapted to decode the RM code. Still further, the range of values which can be taken on by the MODCOD and TYPE information inserted in the input signal can be limited by using the post-selection MOD and TYPE information. This limits the search range for the code word, permitting reduction in the amount of processing during the decoding process.

It should be noted that although, in the above description, a case has been described in which a correlation value calculated based on a differentially detected value is used for frame synchronization, a correlation value indicating the correlation between a synchronously detected symbol string (reception sequence) and a known sequence may be used for frame synchronization.

The present invention is applicable, for example, to a demodulator adapted to demodulate a signal modulated according to the DVB-S.2 standard and to a device having the same (e.g., satellite broadcast receiver).

The present invention is also applicable to a demodulator for demodulating a transmission signal based on a standard other than the DVB-S.2 standard likely to have a plurality of types of frame lengths and a device having the same.

The above series of processes may be performed by hardware or software. If the series of processes is performed by software, the program making up the software is installed from a program recording medium to a computer incorporated in dedicated hardware or to, for example, a general-purpose personal computer capable of performing various functions when installed with various programs.

FIG. 18 is a block diagram illustrating a hardware configuration example of a computer adapted to perform the above series of processes using a program.

In the computer, a CPU (Central Processing Unit) 401, ROM (Read Only Memory) 402 and RAM (Random Access Memory) 403 are connected with each other by a bus 404.

An I/O interface 405 is further connected to the bus 404. An input section 406, output section 407, storage section 408, communication section 409 and drive 410 are connected to the I/O interface 405. The input section 406 includes a keyboard, mouse, microphone and other input devices. The output section 407 includes a display, speaker and other output devices. The storage section 408 includes a hard disk, nonvolatile memory and other storage devices. The communication section 409 includes a network interface and other components. The drive 410 drives a removable medium 411 such as magnetic disc, optical disc, magneto-optical disc or semiconductor memory.

In the computer configured as described above, for example, the above series of processes is performed as the CPU 401 loads the program from the storage section 408 into the RAM 403 via the I/O interface 405 and bus 404 for execution.

The program executed by the computer (CPU 401) is stored in the removable medium 411 which is a package medium such as, for example, magnetic disk (including flexible disk), optical disc (CD-ROM (Compact Disc-Read Only Memory), DVD (Digital Versatile Disc), magneto-optical disk or semiconductor memory. Alternatively, the program is supplied via a wired or wireless transmission medium such as a local area network, the Internet or digital broadcasting.

The program can be installed to the storage section 408 via the I/O interface 405 as the removable medium 411 is attached to the drive 410. Alternatively, the program can be installed to the storage section 408 as the communication section 409 receives the program via a wired or wireless transmission medium. Still alternatively, the program can be preinstalled in the ROM 402 or storage section 408.

It should be noted that the program executed by the computer may be designed to perform the processes in time series according to the sequence described in the present specification. Alternatively, the program may be designed to perform the processes when necessary as when the program is invoked.

It should be noted that the embodiments of the present invention are not limited to those described above, but may be modified without departing from the spirit and scope of the present invention.

The invention claimed is:

1. A frame synchronizer for achieving frame synchronization of an input signal transmitted with any one of a plurality of predetermined types of frame lengths, the frame synchronizer comprising:
   correlation detection means to calculate a correlation value indicating the correlation between a known sequence, which is a symbol string having a known value inserted in the input signal, and a reception sequence which is a symbol string obtained by detecting the input signal,
   wherein the correlation detection means calculates a first correlation value for the absence of a pilot signal inserted in the input signal and a second correlation value for the presence of a pilot signal inserted in the input signal; and
   frame synchronization means which are provided in a number equal to the number of said predetermined types of the frame lengths in a one-to-one correspondence fashion, wherein the correlation detection means supplies the first correlation value to some of the number of frame synchronization means and the second correlation value to other of the second frame synchronization means, wherein the frame synchronization means compare an associated frame length and a peak-to-peak spacing of the correlation value and output a synchronizing signal synchronous with a frame having the associated frame length if the associated frame length matches the peak-to-peak spacing of the correlation value.

2. The frame synchronizer of claim 1, wherein the frame synchronization means further output, together with the synchronizing signal, a transmission parameter adapted to determine the frame length of the input signal and appropriate to the associated frame length.

3. The frame synchronizer of claim 2, further comprising:
an extraction device configured to extract a transmission parameter inserted in the input signal based on the synchronizing signal; and
a determination device configured to determine a degree of reliability of the extracted transmission parameter by comparing values of the transmission parameters output from the frame synchronization means and extracted by the extraction means.

4. The frame synchronizer of claim 2, further comprising a decoding device configured to decode the coded transmission parameter inserted in the input signal in a simplified manner using part of the transmission parameter output from the frame synchronization means.

5. The frame synchronizer of claim 1, wherein if the known sequence takes on a plurality of values due to the value of the transmission parameter adapted to determine the frame length of the input signal, the correlation detection means calculate correlation values associated with the known sequence with the plurality of values, and the frame synchronization means compare the peak-to-peak spacing of the correlation value associated with the value of the known sequence appropriate to the associated frame length with the associated frame length.

6. The frame synchronizer of claim 1, further comprising selection means adapted to select and output the synchronizing signal output from the frame synchronization means associated with the shortest frame length if the synchronizing signals are output from the plurality of frame synchronization means.

7. A frame synchronization method of a frame synchronizer for achieving frame synchronization of an input signal transmitted with any one of a plurality of predetermined types of frame lengths, the frame synchronization method comprising the steps of:
calculating a correlation value indicating the correlation between a known sequence, which is a symbol string having a known value inserted in the input signal, and a reception sequence which is a symbol string obtained by detecting the input signal,
wherein calculating a correlation value includes calculating a first correlation value for the absence of a pilot signal inserted in the input signal and calculating a second correlation value for the presence of a pilot signal inserted in the input signal; and
comparing an associated frame length and a peak-to-peak spacing of the correlation value and output a synchronizing signal synchronous with a frame having the associated frame length if the associated frame length matches the peak-to-peak spacing of the correlation value using frame synchronization means which are provided in a number equal to the number of said predetermined types of the frame lengths in a one-to-one correspondence fashion,
wherein the first correlation value are provided to sonic of the number of frame synchronization means and the second correlation value are provided to other of the second frame synchronization means.

8. A demodulator for demodulating an input signal transmitted with any one of a plurality of predetermined types of frame lengths, the demodulator comprising:
correlation detection means adapted to calculate a correlation value indicating the correlation between a known sequence, which is a symbol string having a known value inserted in the input signal, and a reception sequence which is a symbol string obtained by detecting the input signal;
wherein the correlation detection means calculates a first correlation value for the absence of a pilot signal inserted in the input signal and a second correlation value for the presence of a pilot signal inserted in the input signal; and
frame synchronization means which are provided in a number equal to the number of said predetermined types of the frame lengths in a one-to-one correspondence fashion,
wherein the correlation detection means supplies the first correlation value to some of the number of frame synchronization means and the second correlation value to other of the second frame synchronization means,
wherein the frame synchronization means compare an associated frame length and a peak-to-peak spacing of the correlation value and output a synchronizing signal synchronous with a frame having the associated frame length if the associated frame length matches the peak-to-peak spacing of the correlation value.

9. The demodulator of claim 8, wherein the frame synchronization means further output, together with the synchronizing signal, a transmission parameter adapted to determine the frame length of the input signal and appropriate to the associated frame length, the demodulator further comprising signal processing means adapted to adaptively change processes to be performed on the input signal depending on the quantity of the known sequence found from the transmission parameter output from the frame synchronization means if the transmission parameter contains a parameter adapted to define the quantity of the known sequence inserted in the frame.

* * * * *